United States Patent [19]

Byers et al.

[11] Patent Number: 5,784,712

[45] Date of Patent: Jul. 21, 1998

[54] METHOD AND APPARATUS FOR LOCALLY GENERATING ADDRESSING INFORMATION FOR A MEMORY ACCESS

[75] Inventors: Larry L. Byers, Apple Valley; Gary R. Robeck, Albertville; Terry J. Brunmeier, Shoreview, all of Minn.

[73] Assignee: Unisys Corporation, Blue Bell, Pa.

[21] Appl. No.: 396,677

[22] Filed: Mar. 1, 1995

[51] Int. Cl.⁶ ............................................. G06F 9/32
[52] U.S. Cl. ................................... 711/219; 711/217
[58] Field of Search ................... 395/421.03, 421.07, 395/421.08, 421.09, 421.1; 711/213, 217, 218, 219, 220

[56] References Cited

U.S. PATENT DOCUMENTS

| | | | |
|---|---|---|---|
| 4,020,466 | 4/1977 | Cordi et al. | 707/201 |
| 4,084,231 | 4/1978 | Capozzi et al. | 711/117 |
| 4,298,929 | 11/1981 | Capozzi | 711/201 |
| 4,479,178 | 10/1984 | Schabowshi | 395/309 |
| 4,646,229 | 2/1987 | Boyle | 707/203 |
| 4,751,684 | 6/1988 | Holt | 365/231 |
| 4,819,152 | 4/1989 | Deerfield et al. | 711/217 |
| 4,853,843 | 8/1989 | Ecklund | 707/203 |
| 4,901,227 | 2/1990 | Nomura et al. | 711/219 |
| 5,032,979 | 7/1991 | Hecht et al. | 395/187.01 |
| 5,086,388 | 2/1992 | Matoba et al. | 395/891 |
| 5,089,958 | 2/1992 | Horton et al. | 395/182.03 |
| 5,093,787 | 3/1992 | Simmons | 705/33 |
| 5,146,573 | 9/1992 | Sato et al. | 711/206 |
| 5,202,969 | 4/1993 | Sato et al. | 711/143 |
| 5,222,224 | 6/1993 | Flynn et al. | 711/144 |
| 5,307,484 | 4/1994 | Baker et al. | 707/102 |
| 5,537,622 | 7/1996 | Baum et al. | 707/1 |
| 5,546,592 | 8/1996 | Simpson | 711/219 |

OTHER PUBLICATIONS

Hennessy et al., "Computer Architecture A Quantitative Approach", 1990, pp. 160–167, 199–204.

Schneider et al., "Concepts in Data Structures & Software Development", 1991, pp. 62–67.

Kaunitz et al., "Audit Trail Compaction for Database Recovery", *Communications of the ACM*, vol. 27, No. 7, Jul. 1984.

Verhofstad, "Recovery Techniques for Database Systems", *Computing Surveys*, vol. 10, No. 2, Jun. 1978.

Gray et al., "The Recovery manager of the System R Database Manager", *Computing Surveys*, vol. 13, No. 2, Jun. 1981.

Primary Examiner—Eddie P. Chan
Assistant Examiner—Kevin L. Ellis
Attorney, Agent, or Firm—Nawrocki, Rooney & Sivertson, P.A.

[57] ABSTRACT

A method and apparatus for efficiently reading or writing a number of successive address locations within a memory. In an exemplary embodiment, a processor or the like may not be required to provide an address to a memory unit for each read and/or write operation when successive address locations are accessed. That is, for multiple memory accesses which access successive address locations, the processor or the like may provide an initial address but thereafter may not be required to provide subsequent addresses to the memory unit. The subsequent addresses may be automatically generated by an automatic-increment block.

4 Claims, 25 Drawing Sheets

— 60

| MEMORY READ | |
|---|---|
| STEP | ACTION |
| 1 | USER OBTAINS CONTROL OF THE BUS |
| 2 | USER WRITES AN ADDRESS/CONTROL TO ADDRESS REGISTER |
| 3 | MEMORY READS ADDRESS AND PROVIDES DATA TO READ DATA REG |
| 4 | READ DATA REG PROVIDES DATA TO USER VIA BUS |
| 5 | REPEAT STEPS 1 THROUGH 4 |

| MEMORY WRITE | |
|---|---|
| STEP | ACTION |
| 1 | USER OBTAINS CONTROL OF THE BUS |
| 2 | USER WRITES AN ADDRESS/CONTROL TO ADDRESS REGISTER |
| 3 | USER WRITES A DATA WORD TO DATA REGISTER |
| 4 | MEMORY WRITES THE DATA WORD TO THE ADDRESS LOCATION |
| 5 | REPEAT STEPS 1 THROUGH 4 |

| SIGNAL | SIGNAL DESCRIPTION |
|---|---|
| D(0-31) | DSD DATA BUS (I,O,Z) - BI-DIRECTIONAL MAIN DATA PATH FOR ALL OPERATIONS - ASSERTED BY BUS MASTER FOR WRITE OPERATIONS AND BY BUS SLAVE FOR READ OPERATIONS |
| DP(0-3) | DSD DATA BUS PARITY (I,O,Z) - DP0 = PARITY FOR D0-7. DP1 = PARITY FOR D8-15. DP2 = PARITY FOR D16-23. DP3 = PARITY FOR D24-31. |
| A(0-29) | DSD ADDRESS BUS (I,O,Z) - BI-DIRECTIONAL ADDRESS BUS FOR ALL DEVICES ATTACHED TO THE INTERFACE - ASSERTED BY THE BUS MASTER. |
| ADS/ | ADDRESS STATUS (I,O,Z) - WHEN ASSERTED BY THE BUS MASTER, THE CONTENTS OF THE ADDRESS BUS ARE VALID - DEFINES THE START OF A BUS CYCLE |
| W-R/ | WRITE/READ (I,O,Z) - INDICATES THE DIRECTION OF DATA TRANSFER RELATIVE TO THE BUS MASTER - DRIVEN BY THE BUS MASTER. WRITE=1, READ=0. |
| HOLD/ | HOLD (O) - ASSERTED BY DEVICE TO INDICATE THAT IT IS REQUESTING BUS MASTERSHIP |
| HLDAI/ | HOLD ACKNOWLEDGE (I) - ASSERTED BY BUS ARBITRATION LOGIC TO INDICATE THAT THE PREVIOUS BUS MASTER HAS RELINQUISHED USE OF THE BUS. |
| BCLK | BUS CLOCK (I) - CLOCK SIGNAL THAT CONTROLS THE DMA PORTION OF THE NCR53C720 |
| RESET/ | CHIP RESET (I) - FORCES A SYNCHRONOUS FULL CHIP RESET OF THE NCR53C720 - MUST BE ASSERTED FOR A MINIMUM OF 15 BUS CYCLES |
| CS/ | CHIP SELECT (I) - SELECTS THE NCR53C720 AS A SLAVE DEVICE - CONNECTED TO ADDRESS BIT 6 IN THE DSD APPLICATION |
| IRQ/ | INTERRUPT (O) - INDICATES THAT SERVICE IS REQUIRED FROM THE USBC |

FIG. 11A

| SIGNAL | SIGNAL DESCRIPTION |
| --- | --- |
| BE3/ | BYTE ENABLE THREE (I,O,Z) - ENABLES DATA TRANSFER ON DATA BUS LINES D0-D7 - ASSERTED BY BUS MASTER |
| BE2/ | BYTE ENABLE TWO (I,O,Z) - ENABLES DATA TRANSFER ON DATA BUS LINES D8-D15 - ASSERTED BY BUS MASTER |
| BE1/ | BYTE ENABLE ONE (I,O,Z) - ENABLES DATA TRANSFER ON DATA BUS LINES D16-D23 - ASSERTED BY BUS MASTER |
| BE0/ | BYTE ENABLE ZERO (I,O,Z) - ENABLES DATA TRANSFER ON DATA BUS LINES D24-D31 - ASSERTED BY BUS MASTER |
| READYI/ | READY-IN (I) - SIGNAL FROM SLAVE DEVICE TO BUS MASTER INDICATING THAT SLAVE IS READY TO TRANSFER DATA |
| READYO/ | READY-OUT (O) - ASSERTED TO INDICATE THE END OF A SLAVE MODE CYCLE - THE NCR53C720 PROVIDES THIS SIGNAL TO TERMINATE A SLAVE CYCLE |
| MASTER/ | MASTER STATUS (O) - ASSERTED BY THE NCR53C720 WHEN IT BECOMES THE MASTER |
| BS(2-0) | BUS MODE SELECT (I) - SELECTS THE BUS MODE (MOTOROLA OR INTEL) AND ADDRESSING MODE (BIT OR LITTLE ENDIAN) - IN THE DSD APPLICATION, BS(2-0) = "010" THEREBY SELECTING 80386DX LIKE (BUS MODE 4) AND BIG ENDIAN BUS MODE. |
| AUTO/ | SCRIPTS AUTOSTART MODE (I) - SELECTS EITHER AUTO OR MANUAL SCRIPTS START MODE. WHEN AUTO/=0, SCRIPTS STARTS AT ADDRESS-0 (ADDRESS IN DSP REGISTER OF NCR DEVICE) AUTOMATICALLY FOLLOWING A CHIP RESET. WHEN AUTO/=1, SCRIPTS STARTS AFTER THE DSP REGISTER HAS BEEN LOADED BY THE USBC. IN THE DSD APPLICATION, AUTO/ IS SET TO 1. |

METHOD AND APPARATUS FOR LOCALLY GENERATING ADDRESSING INFORMATION FOR A MEMORY ACCESS

CROSS REFERENCE TO CO-PENDING APPLICATIONS

The present application is related to U.S. Pat. application Ser. No. 08/396,951, filed Mar. 1, 1995, entitled "Method and Apparatus For Storing Computer Data After a Power Failure", which is assigned to the assignee of the present invention and is incorporated herein by reference.

BACKGROUND OF THE INVENTION

1. Field of the Invention - The present invention generally relates to general purpose digital data processing systems and more particularly relates to such systems which access memory elements therein.

2. Description of the Prior Art - Modern computer systems may generally have at least one processor for processing a number of transactions. The processor may read data from a disk drive or the like and may perform processing thereon. However, the processor may process the data faster than a disk drive can supply the data. Therefore, memory units which are coupled to the processor may be provided. The memory units may provide a fast data storage resource for a corresponding processor.

Modern computer systems typically require a large amount of memory to operate efficiently. For example, in a typical computer system, an application program and a number of temporary data elements may be stored in the memory unit. Consequently, it is common to have a large array of memory units located on a memory card or equivalent within the computer system. Since a relatively large amount of data may be transferred between a processor and a corresponding memory unit in a relatively short period of time, the interface between the processor and the memory unit may be of utmost importance.

System designers have developed a number of techniques which are commonly used to provide an interface between a processor and a memory unit. One such technique is to provide a direct link between each processor and each memory unit. This technique is commonly called a point-to-point interface. In a strict point-to-point approach, a processor may provide a set of address lines, a set of data lines, and a number of control signals to each memory unit. An advantage of the strict point-to-point approach is that each memory unit only services one processor and has a dedicated interface therewith. This may provide a fast data storage resource for the corresponding processor. A limitation of the strict point-to-point approach is that the memory unit may only service a single processor. Modern computer systems may have a number of processors therein and it is often desirable to share data therebetween. The strict point-to-point approach may prohibit one processor from gaining access to another processor's memory unit. Another limitation of the strict point-to-point approach may be that a relatively large number of signal traces may be required to interconnect each of the processors with each of the corresponding memory units. With the dramatic increase in circuit densities in recent years, it may be impractical to provide a separate trace on a corresponding printed circuit board for each address line, data line, and control line between each processor and each corresponding memory unit. Finally, the charging and discharging of each one of the signal traces provided on the printed circuit board may require a substantial amount of power.

2

A more common technique for providing an interface between a processor and a memory unit is to provide a common bus therebetween. That is, a number of memory units and a number of processors may be coupled to a common bus. The common bus may have a number of address lines, a number of data lines, and a number of control lines. The number of address lines, data lines and control lines correspond to the number of address inputs, data inputs, and control inputs provided on each memory unit. A data transfer between any of the processors and any of the memory units may utilize the same address, data, and control lines. An advantage of the common bus approach is that any one of the processors may gain access to any of the memory units. This may allow the processors to share data. Another advantage of the common bus approach may be that a smaller number of signal traces may be required to interconnect each of the processors to each of the corresponding memory units. That is, only one set of address lines, data lines, and control lines may be provided. This may significantly reduce the number of separate traces that must be provided on a corresponding printed circuit board over the point-to-point approach and may reduce the power required thereby.

A limitation of the common bus approach may be that only one data transfer may take place at any given time. That is, since the processors share the common bus, the performance of the corresponding computer system may suffer. Finally, while not as much as the point-to-point approach discussed above, the charging and discharging of each one of the signal traces provide on the printed circuit board may still require a significant amount of power.

To limit the number of signal traces on a corresponding PC board, and to limit the amount of power required to charge and discharge the signal traces, system designers have developed a modified common bus approach. The modified common bus approach is commonly used for multi-purpose bus applications wherein some of the bus transfers may be serviced by a bus having a narrow bus width while other bus transfers may require a wider bus width. Rather than providing a bus width sufficient to accommodate the wider bus transfers, system designers may provide a bus having a width only sufficient to accommodate the narrow bus transfers. This may allow a smaller and/or less dense printed circuit board and may lower the power requirements for a corresponding system.

To accomplish the wider bus transfers discussed above, the bus signals may be partitioned into a number of predetermined groups. Each group may be sent over the modified common bus in a time sequenced manner. For example, a processor may provide an address to a memory element during a first bus transfer. The processor may then provide a data word to the memory during a second bus transfer. Finally, the processor may provide a control word to the memory during a third bus transfer. Using this approach, the wider bus transfers may be provided over the narrower bus.

Because the bus signals may be provided over the modified common bus in a time sequenced manner, it is often necessary to provide interface logic between the modified common bus and a corresponding device. For example, a processor may be coupled directly to the modified common bus. However, a corresponding memory unit may have an interface block interposed between the modified common bus and the memory units' inputs. The interface block may buffer the number of time sequenced groups until the entire transfer is complete. The number of groups may then be provided to the corresponding memory unit.

For a read operation, the processor may provide an address during a first bus transfer and may provide a control word during a second bus transfer. The interface block may then provide the address and the control word to the memory unit. The memory unit may then read the corresponding address and provide a resulting data word to the interface block. The interface block may then provide the resulting data word to the processor during a third bus transfer. This process may continue for each subsequent read operation. For a write operation, the processor may provide an address during a first bus transfer, a data word during a second bus transfer, and a control word during a third bus transfer. The interface block may then provide the address, data word, and control word to the memory unit. The memory unit may then write the data word to the corresponding address location. This process may continue for each subsequent write operation.

A limitation of the modified common bus approach is that the performance thereof may be limited. For example, for a single read and/or write operation discussed above, three independent bus transfers must be made between the processor and the memory unit. Further, since the modified common bus may be shared between a number of processors and a number of memory units, each bus transfer may have to arbitrate for control of the bus. This may further reduce the performance of the modified common bus approach. As can readily be seen, if a relatively large number of transfers are to be made between devices, the modified common bus approach may be limiting.

A limitation of all of the above referenced interface techniques including the point-to-point approach, the common bus approach, and the modified common bus approach is that a processor must attend to each read and/or write operation in real time. This may prohibit the processor from performing other tasks while a number of successive read and/or write operations are made to a memory unit.

SUMMARY OF THE INVENTION

The present invention overcomes many of the disadvantages of the prior art by providing a system whereby a processor or the like need not provide an address to a memory unit for each read and/or write operation when successive address locations are accessed. That is, for multiple memory accesses which access successive address locations, the processor or the like may provide an initial address but thereafter may not be required to provide subsequent addresses to the memory unit. The subsequent addresses may be automatically generated by an automatic-increment block. This may have a number of advantages. For example, a processor or the like may provide an initial address to the memory unit and then may be free to perform other tasks while the number of successive read and/or write operations are made to a memory unit. That is, the processor or the like may perform a "block" read and/or write operation of the memory unit wherein a predefined number of successive address locations may be read and/or written without the support of the processor or the like. The processor may specify the predefined number of successive addresses to access in advance.

For a number of successive read operations, the processor may only need to read the data provided by the memory unit. For a number of successive write operations, the processor may only need to provide the write data to the memory unit. To ensure the processor of the like is free to process other tasks during a "block" read and/or write operation, a buffer block may be provided in the processor wherein the buffer block may write or read the necessary data to/from the memory unit.

Another advantage of the present invention is that many of the disadvantages of the modified common bus approach discussed above may be overcome while maintaining the advantages thereof. As stated above, the modified common bus approach may reduce the number of signal traces that must be provided on a corresponding PC board. Further, the modified common bus approach may limit the amount of power required to charge and discharge the corresponding bus traces. These are significant advantages of the modified common bus approach. However, the modified common bus approach suffers from a number of limitations. As discussed above, the performance of the modified common bus may be limited. For example, for a single read and/or write operation of a memory unit, a number of independent bus transfers may be required. Further, since the modified common bus may be shared between a number of processors and a number of memory units, each bus transfer may have to arbitrate for the control of the bus. This may further reduce the performance of the modified common bus approach. The present invention may significantly overcome these limitations.

In the present invention, a processor or the like may only provide an initial address and an initial control word to a memory unit. Thereafter, the processor or the like need only read the data provided by the memory unit for subsequent read operations or need only provide the data to the memory unit for subsequent write operations. An automatic increment block may calculate the subsequent addresses for each access. That is, for a typical read operation of a number of successive address locations in a memory device, a number of bus transfers over the modified common bus may be eliminated after initialization. This may significantly increase the amount of data that may be provided over the modified common bus.

In an exemplary embodiment, a user may be coupled to a memory interface block wherein the memory interface block may be coupled to a memory unit. It is contemplated that the user may be coupled to the memory interface block via a point-to-point interface, a common bus interface, a modified common bus interface, or any other interface means. For a write operation, the user may provide an initial address, a data word, and a control word to the memory interface block. The memory interface block may then provide the address, the data word, and the control word to the memory unit. The memory unit may then write the data word to the corresponding address location. For subsequent write operations to successive address locations, the memory interface block may automatically increment the address thereby providing a next address to the memory unit. Further, the memory interface block may store the control word for subsequent memory accesses. Thereafter, the user need only provide a data word to the memory interface block for each subsequent write operation.

For a read operation, the user may provide an initial address and a control word to the memory interface block. The memory interface block may then provide the address and the control word to the memory unit. The memory unit may then read the corresponding memory address location and provide a resulting data word to the memory interface block. The user may then read the resulting data word from the memory interface block. For subsequent read operations to successive address locations, the memory interface block may automatically increment the address thereby providing a next address to the memory unit. Further, the memory interface block may store the control word for subsequent memory accesses. Thereafter, the user need only read subsequent data words from the memory interface block for each subsequent read operation.

It is contemplated that the memory interface block may automatically manipulate the address in any predetermined way. For example, the memory interface block may automatically increment the address, automatically decrement the address, automatically add an integer "N" to the address, multiply the address by a number "X", or perform any other manipulating means.

In the exemplary embodiment described above, the memory interface block may have an address register, a write data register, a read data register, a control block, and an auto-increment block. The memory interface block may be coupled to the user via a modified common bus. For a read operation, the user may provide an address to the address register during a first bus transfer. The address may contain both an address and a number of control signals. A portion of the control signals may be provided to the control block wherein the control block may determine if the memory interface block is to automatically increment the address for subsequent memory accesses. The address register may provide the memory address to the memory unit wherein the memory unit may read the corresponding address location and provide a resulting data word to the read data register. The user may then read the contents of the read data register to complete the read operation. Thereafter, if the control block determines that the memory interface block is in the auto-increment mode, the address may be automatically incremented for subsequent memory accesses. The user need only read the contents of the read data register to complete each successive read operation. The user may not be required to provide an addresses to the memory interface block for the subsequent read operations.

For a write operation, the user may provide an address to the address register during a first bus transfer. The address may contain both an address and a number of control signals. A portion of the control signals may be provided to the control block wherein the control block may determine if the memory interface block is to automatically increment the address for subsequent memory accesses. The user may then provide a data word to the write data register during a second bus cycle. The memory interface block may then provide the memory address and the write data word to the memory unit wherein the memory unit may write the data word to the corresponding address location. Thereafter, if the control block determines that the memory interface block is in the auto-increment mode, the address is automatically incremented for subsequent memory accesses. The user need only provide a write data word to the write data register to complete each successive write operation. The user may not be required to provide an addresses to the memory interface block for the subsequent write operations.

In another exemplary embodiment of the present invention, the memory interface block may comprise a data save disk controller (DSDC). The DSDC element may provide an interface between a first bus and a second bus. The first bus may be a modified common bus and may be coupled to a number of microsequencer bus controllers (USBCs). The second bus may be a common bus and may be coupled to a memory unit and a disk controller. The DSDC element may have an address register, a data register, and an auto-increment block.

When a USBC initiates a read of the memory, the USBC may provide an address to the address register within the DSDC element. The address may contain both a memory address and a number of control bits. A portion of the control bits are coupled to an auto-increment block and control the auto-increment block. If the USBC provides the appropriate combination of control bits within the address, the auto-increment block is enabled, thereby automatically incrementing the value in the address register after each memory access. The address register may provide the memory address to the memory unit wherein the memory unit may read the corresponding address location and may provide a resulting data word to the data register in the DSDC element. The USBC may then read the contents of the data register over the first bus to complete the read operation. Thereafter, if the auto-increment block is enabled, the address may be automatically incremented after each memory access is complete. In an exemplary embodiment, the DSDC may provide a data ready bit to indicate that a corresponding memory access is complete. Thus, the USBC may only need to read the contents of the data register to complete each successive read operation.

When a USBC initiates a write of the memory, the USBC may provide an address to the address register during a first bus transfer. Similarly, the USBC may provide a data word to the data register during a second bus transfer. The address may contain both a memory address and a number of control bits. A portion of the control bits are coupled to an auto-increment block and control the auto-increment block. If the USBC provides the appropriate combination of control bits within the address, the auto-increment block is enabled, thereby automatically incrementing the value in the address register after each memory access. The address register may provide the memory address to the memory unit and the data register may provide the data word to the memory unit. The memory unit may then write the data word to the corresponding address location within the memory unit. Thereafter, if the auto-increment block is enabled, the address may be automatically incremented after each memory access is complete. In an exemplary embodiment, the DSDC may provide a data ready bit to indicate that a corresponding memory access is complete. Thus, the USBC may only need to provide a write data word to the data register to complete each successive write operation.

It is contemplated that a word count register may also be provided in the DSDC element. The USBC may provide a word count to the word count register during a first read or write operation. Thereafter, the word count register may be decremented after each successive memory access. When the word count reaches a predetermined value, the DSDC and/or USBC may be notified and the corresponding memory operation may be terminated.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 3A is a table showing typical steps performed during a number of read operations between a user and a memory unit using a modified common bus approach;

FIG. 3B is a table showing typical steps performed during a number of write operations between a user and a memory unit using a modified common bus approach;

FIGS. 11A–11B comprise a table illustrating an exemplary bus description of the DSD bus of FIG. 9;

DETAILED DESCRIPTION OF THE PREFERRED EMBODIMENTS

Figure 1:
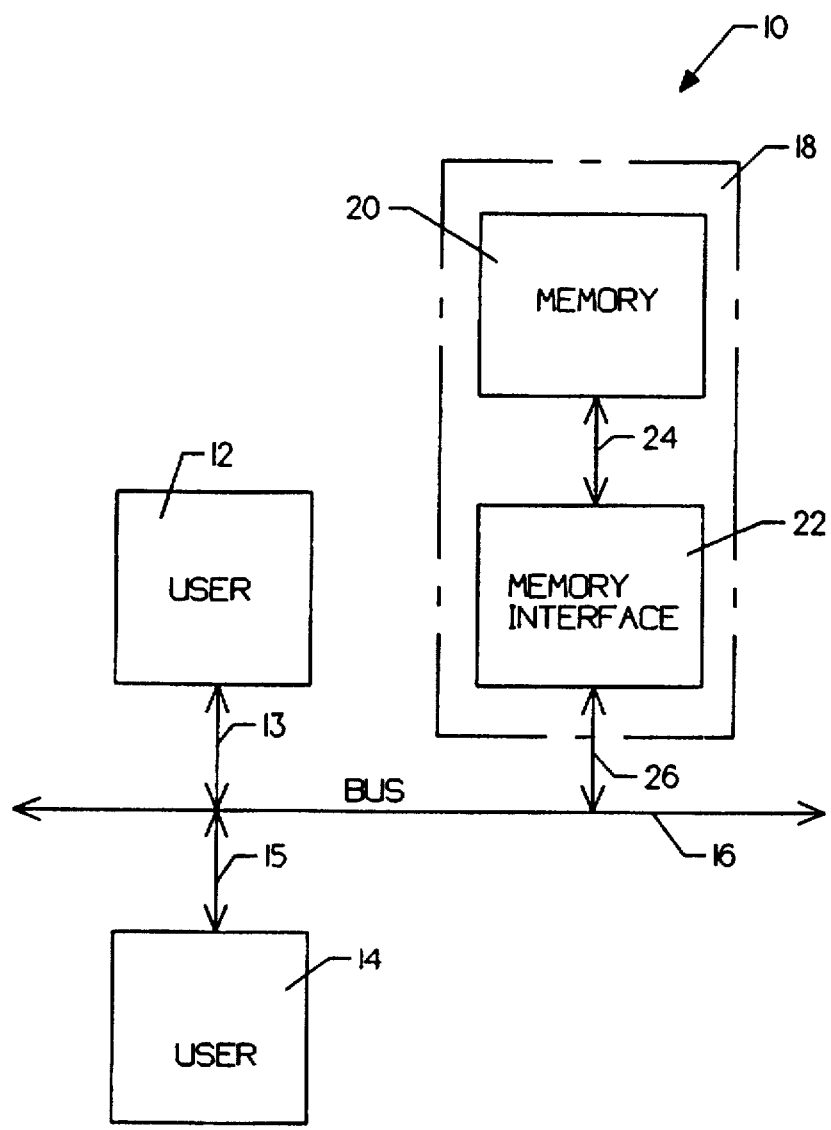
FIG. 1 is a block diagram of a system having a number of users coupled to a memory unit.

FIG. 1 is a block diagram of a system having a number of users coupled to a memory unit. The apparatus is generally shown at 10. A first user 12 and a second user 14 may be coupled to a bus 16 via interfaces 13 and 15, respectively. Users 12 and 14 may comprise a processor, a host computer, or any other type of user element. It is contemplated that any number of users may be coupled to bus 16. A memory unit 18 may be coupled to bus 16 via interface 26. Although only one memory unit 18 is shown, it is contemplated that there may be any number of memory units 18 coupled to bus 16.

It is further contemplated that bus 16 may be a common bus or a modified common bus wherein user 12 and user 14 may access memory unit 18 via bus 16. Memory unit 18 may provide a fast data storage resource for users 12 and 14.

As indicated above, it is contemplated that bus 16 may be a common bus. That is, a number of memory units 18 and a number of users 12,14 may be coupled to common bus 16. Common bus 16 may have a number of address lines, a number of data lines, and a number of control lines. The number of address lines, data lines and control lines correspond to the number address inputs, data inputs, and control inputs provided on each memory unit 18. A data transfer between any of the users 12,14 and any of the memory units 18 may utilize the same address, data, and control lines. An advantage of the common bus approach is that any one of the users 12,14 may gain access to any of the memory units 18. This may allow the users 12,14 to share data. Another advantage of the common bus approach may be that a smaller number of signal traces may be required to interconnect each of the users 12,14 to each of the corresponding memory units 18. That is, only one set of address lines, data lines, and control lines may be provided. This may significantly reduce the number of separate traces that must be provided on a corresponding printed circuit board over a point-to-point approach and may reduce the power required thereby.

A limitation of the common bus approach may be that only one data transfer may take place at any given time. That is, since the users 12,14 share common bus 16, the performance of the corresponding computer system may suffer. Finally, while not as much as a point-to-point approach, the charging and discharging of each one of the signal traces provided on the printed circuit board may still require a significant amount of power.

To limit the number of signal traces on a corresponding PC board, and to limit the amount of power required to charge and discharge the signal traces, system designers have developed a modified common bus approach. The modified common bus approach is commonly used for multi-purpose bus applications wherein some of the bus transfers may be serviced by a bus having a narrow bus width while other bus transfers may require a wider bus width. Rather than providing a bus width sufficient to accommodate the wider bus transfers, system designers may provide a bus having a width only sufficient to accommodate the narrow bus transfers. This may allow a smaller and/or less dense printed circuit board and may lower the power requirements for a corresponding system. Referring to FIG. 1, it is contemplated that bus 16 may comprise a modified common bus.

To accomplish the wider bus transfers discussed above, the bus signals may be partitioned into a number of predetermined groups. Each group may be sent over the modified common bus 16 in a time sequenced manner. For example, user 12 may provide an address to memory unit 18 during a first bus transfer. User 12 may then provide a data word to memory unit 18 during a second bus transfer. Finally, user 12 may provide a control word to memory unit 18 during a third bus transfer. Using this approach, the wider bus transfers may be provided over the narrower bus 16.

Because the bus signals may be provided over the modified common bus in a time sequenced manner, it is often necessary to provide interface logic between the modified common bus and a corresponding device. Referring to FIG. 1, memory unit 18 may have a memory interface 22 and a memory element 20. Memory interface 22 may be coupled to bus 16 via interface 26 and may be further coupled to memory element 20 via interface 24. That is, memory unit 18 may have a memory interface 22 interposed between modified common bus 16 and the memory element's inputs. Memory interface 22 may buffer the number of time sequenced groups until the entire transfer is complete. The number of groups may then be provided to the corresponding memory element 20.

For a read operation, user 12 may provide an address during a first bus transfer and may provide a control word during a second bus transfer. Memory interface 22 may then provide the address and the control word to memory element 20. Memory element 20 may then read the corresponding address and provide a resulting data word to memory interface 22. Memory interface 22 may then provide the resulting data word to the user 12 during a third bus transfer. This process may continue for each subsequent read operation. For a write operation, user 12 may provide an address during a first bus transfer, a data word during a second bus transfer, and a control word during a third bus transfer. Memory interface 22 may then provide the address, data word, and control word to memory element 20. Memory element 20 may then write the data word to the corresponding address location. This process may continue for each subsequent write operation.

A limitation of the modified common bus approach is that the performance thereof may be limited. For example, for a single read and/or write operation discussed above, three independent bus transfers must be made between user 12 and memory unit 18. Further, since the modified common bus may be shared between a number of users 12,14 and a number of memory units 18, each bus transfer may have to arbitrate for control of bus 16. This may further reduce the performance of the modified common bus approach. As can readily be seen, if a relatively large number of transfers are to be made between devices, the modified common bus approach may be limiting.

A limitation of the above referenced interface techniques including the point-to-point approach, the common bus approach, and the modified common bus approach is that users 12 and 14 must attend to each read and/or write operation in real time. This may prohibit users 12 and 14 from performing other tasks while a number of corresponding successive read and/or write operations are made to memory unit 18.

Figure 2:
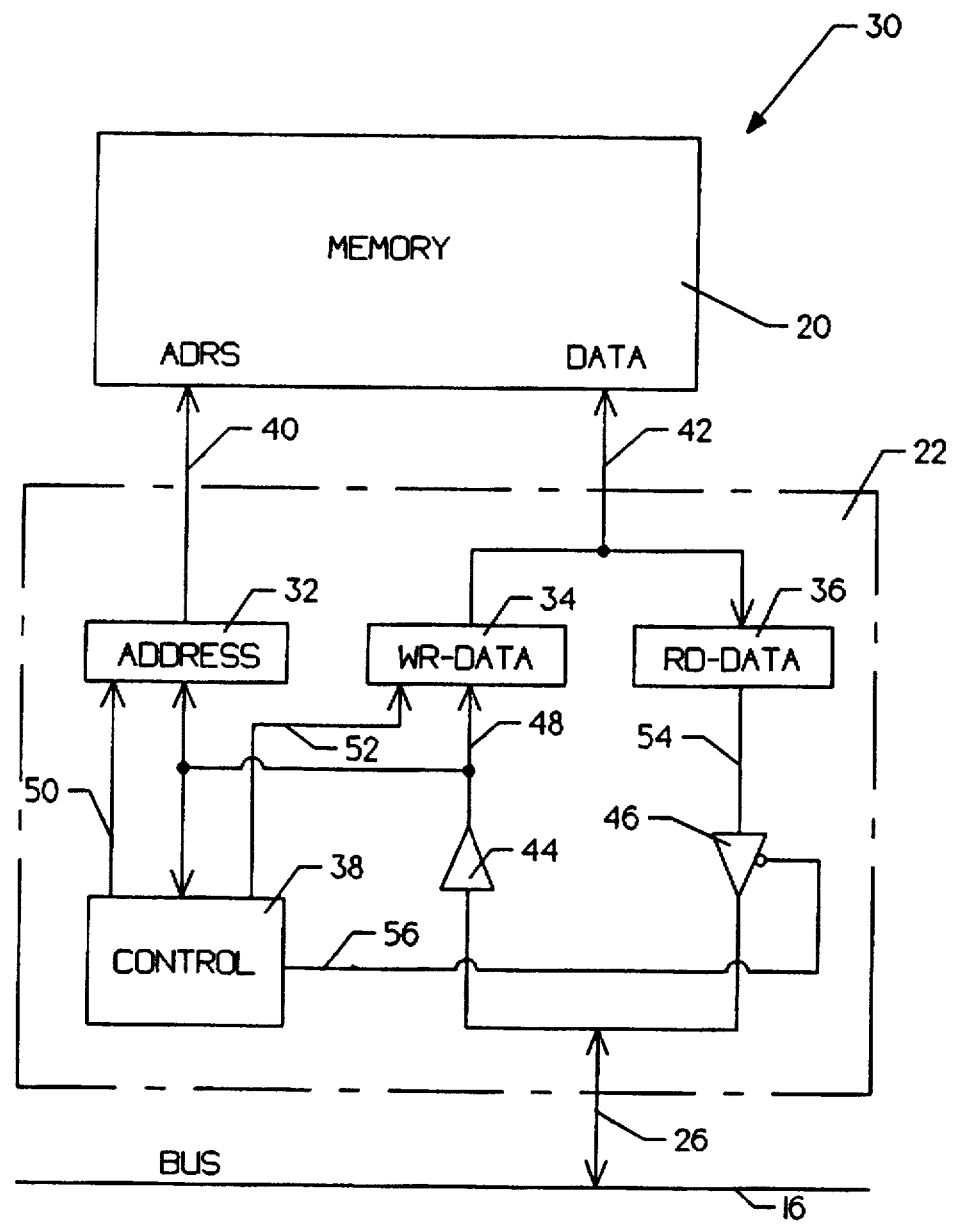
FIG. 2 is a schematic diagram of the memory unit of FIG. 1 wherein bus 16 is in accordance with a modified common bus approach.

FIG. 2 is a schematic diagram of the memory unit of FIG. 1 wherein bus 16 is in accordance with a modified common bus approach. The diagram is generally shown at 30. Memory interface 22 is coupled to bus 16 via interface 26 and is further coupled to memory element 20 via interfaces 40 and 42. Memory interface 22 has an address register 32, a write data register 34, a read data register 36, a control block 38, and a bi-directional buffer. The bi-directional buffer includes an input buffer 44 and an output buffer 46. Input buffer 44 is coupled to bus 16 via interface 26 and is further coupled to address register 32, write data register 34, and control block 38 via interface 48. Address register 32 is coupled to an address input port of memory element 20 via interface 40. Write data register 34 and read data register 36 are coupled to a data I/O port of memory 20 via interface 42. Read data register 36 is coupled to output buffer 46 via interface 54. Output buffer 46 is coupled to bus 16 via interface 26. Finally, control block 38 provides enables to address register 32, write data register 34, and output buffer 46 via interfaces 50, 52, and 56, respectively.

For a read operation, user 12 or user 14 may provide an address to memory interface 22 during a first bus transfer. The address includes both a memory address and a number of memory control bits. The address is provided to address register 32 via input buffer 44. During the first bus transfer, control block 38 enables address register 32 to capture the address provided thereto. Address register 32 then provides the address to memory element 20 via interface 40. Memory element 20 then reads the corresponding address and provides a resulting data word to read data register 36 via interface 42. Control block 38 then enables output buffer 46 via interface 56 thereby allowing the resulting data word to be provided to bus 16 via interface 26. This process may continue for each subsequent read operation.

For a write operation, user 12 or user 14 provides an address to memory interface 22 during a first bus transfer. The address includes a memory address and a number of memory control bits. The address is provided to address register 32 via input buffer 44. During the first bus transfer, control block 38 enables address register 32 to capture the address provided thereto. Thereafter, user 12 or user 14 provide a write data word to memory interface 22 during a second bus transfer. The write data word is provided to write data register 43 via input buffer 44. During the second bus transfer, control block 38 enables write data register 34 to capture the write data word provided thereto. Address register 32 and write data register 34 then provide the address and the write data word to memory element 20 via interfaces 40 and 42, respectively. Memory element 20 then writes the write data word to the corresponding address location within memory element 20. This process may continue for each subsequent write operation.

A limitation of the modified common bus approach is that the performance thereof may be limited. For example, for a single read and/or write operation discussed above, two independent bus transfers must be made between user 12 and memory unit 18. Further, since the modified common bus may be shared between a number of users 12,14 and a number of memory units 18, each bus transfer may have to arbitrate for control of bus 16. This may further reduce the performance of the modified common bus approach. As can readily be seen, if a relatively large number of transfers are to be made between devices, the modified common bus approach may be limiting.

A limitation of the above referenced interface techniques including the point-to-point approach, the common bus approach, and the modified common bus approach is that users 12 and 14 must attend to each read and/or write operation in real time. This may prohibit users 12 and 14 from performing other tasks while a number of corresponding successive read and/or write operations are made to me FIG. 3A is a table showing typical steps performed during a number of read operations between a user and a memory unit using a modified common bus approach. The table is generally shown at 60. The step number is shown in column 62 while the action performed is shown in column 64. During a first step, a user arbitrates and eventually obtains control of bus 16. During a second step, the user writes an address/control word to address register 32 via bus 16 (see FIG. 2). During a third step, address register 32 provides the address to memory element 20 wherein memory element 20 reads the corresponding address location and provide a resulting read data word to read data register 36. During a fourth step, the read data register provides the read data word to the user via bus 16. For subsequent read operations, the first through fourth steps are repeated.

FIG. 3B is a table showing typical steps performed during a number of write operations between a user and a memory unit using a modified common bus approach. The table is generally shown at 70. The step number is shown in column 72 while the action performed is shown in column 74. During a first step, a user arbitrates and eventually obtains control of bus 16. During a second step, the user writes an address/control word to address register 32 via bus 16 (see FIG. 2). During a third step, the user writes a write data word to write data register 34. During a fourth step, address register 32 and write data register 34 provide the address and the write data word to memory element 20 wherein memory element 20 writes the write data word to the corresponding address location. For subsequent write operations, the first through fourth steps are repeated.

Figure 4:
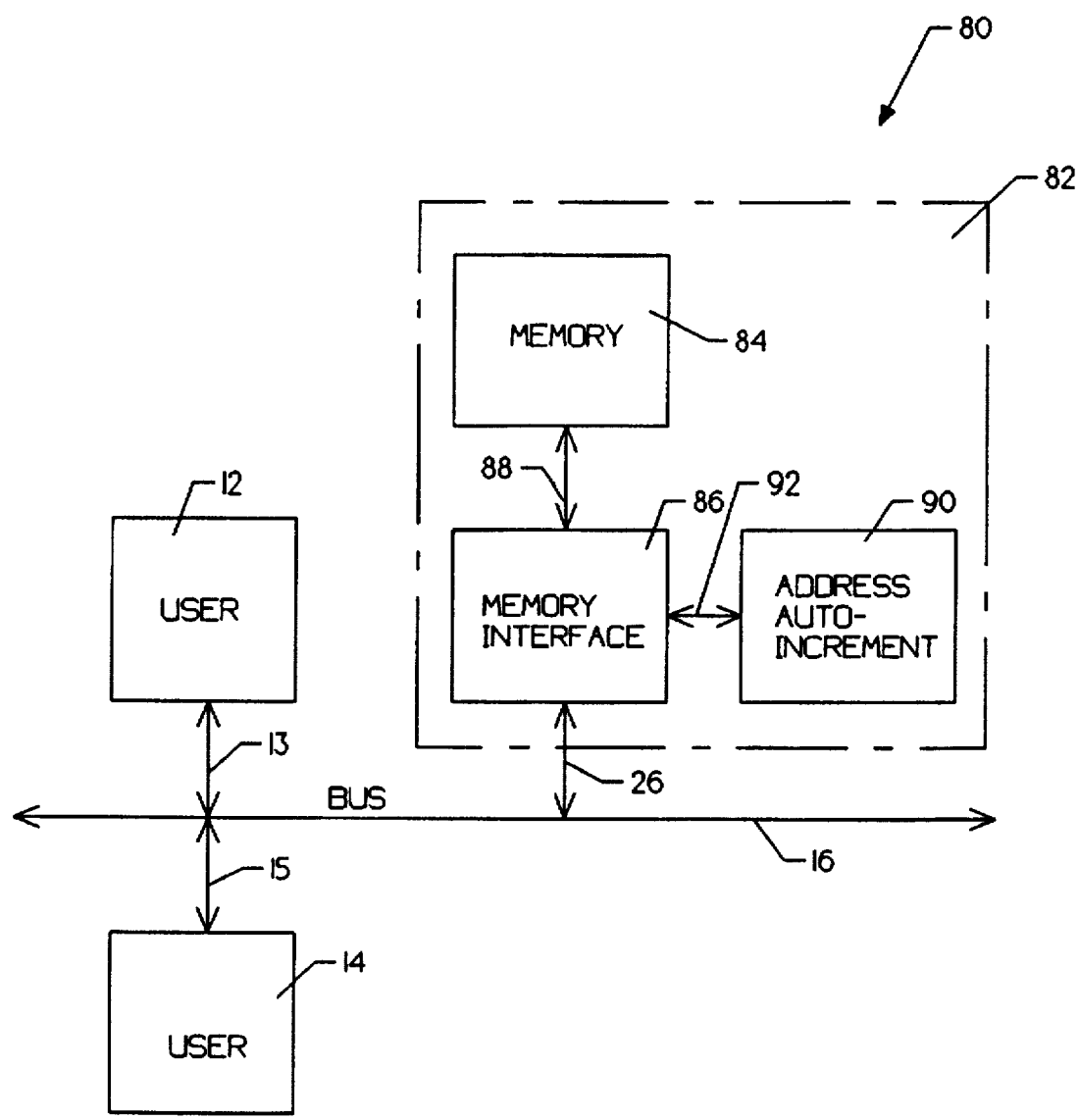
FIG. 4 is a block diagram of a system having a number of users coupled to a memory unit wherein the memory unit comprises an auto-increment block therein.

FIG. 4 is a block diagram of a system having a number of users coupled to a memory unit wherein the memory unit comprises an auto-increment block therein. The apparatus is generally shown at 80. A first user 12 and a second user 14 are coupled to a bus 16 via interfaces 13 and 15, respectively. Users 12 and 14 may comprise a processor, a host computer, or any other type of user element. It is contemplated that any number of users may be coupled to bus 16. A memory unit 82 is coupled to bus 16 via interface 26. Although only one memory unit 82 is shown, it is contemplated that there may be any number of memory units 82 coupled to bus 16. It is further contemplated that bus 16 may be a point-to-point bus, a common bus, a modified common bus, or any other interface means, wherein user 12 and user 14 may access memory unit 82 via bus 16. Memory unit 82 may provide a fast data storage resource for users 12 and 14.

Memory unit 82 has a memory interface 86 and a memory element 84. Memory interface 86 is coupled to bus 16 via interface 26 and is further coupled to memory element 84 via interface 88. That is memory unit 82 has a memory interface 86 interposed between modified common bus 16 and the memory element's inputs. Memory unit 82 further includes an autoincrement block 90 wherein the auto-increment block 90 is coupled to memory interface 86 via interface 92.

In the exemplary embodiment, a user 12 need not provide an address to memory unit 82 for each read and/or write operation when successive address locations are accessed. That is, for multiple memory accesses which access successive address locations, user 12 may provide an initial address but thereafter is not required to provide subsequent addresses to memory unit 82. The subsequent addresses are automatically generated by automatic-increment block 90. This may have a number of advantages. For example, user 12 may provide an initial address to memory unit 82 and then may be free to perform other tasks while the number of successive read and/or write operations are made to memory unit 82. That is, user 12 may perform a "block" read and/or write operation of memory unit 82 wherein a predefined number of successive address locations may be read and/or written without requiring user 12 to provide the successive addresses and/or data elements. User 12 may specify the predefined number of successive addresses to access in advance.

For a number of successive read operations, user 12 may only need to read the data provided by memory unit 82. For a number of successive write operations, user 12 may only need to provide the write data to memory unit 82. To ensure user 12 is free to process other tasks during a "block" read and/or write operation, a buffer block may be provided in user 12 (not shown) wherein the buffer block may write or read the necessary data to/from memory unit 82.

Another advantage of the present invention is that many of the disadvantages of the modified common bus approach discussed above may be overcome while maintaining the advantages thereof. As stated above, the modified common bus approach may reduce the number of signal traces that must be provided on a corresponding PC board. Further, the modified common bus approach may limit the amount of power required to charge and discharge the corresponding bus traces. These are significant advantages of the modified common bus approach. However, the modified common bus approach suffers from a number of limitations. As discussed above, the performance of the modified common bus may be limited. For example, for a single read and/or write operation of a memory unit, a number of independent bus transfers may be required. Further, since the modified common bus may be shared between a number of processors and a number of memory units, each bus transfer may have to arbitrate for the control of the bus. This may further reduce the performance of the modified common bus approach. The present invention may significantly overcome these limitations.

In the present invention, user 12 only provides an initial address and an initial control word to memory unit 82. Thereafter, user 12 need only read the data provided by memory unit 82 for subsequent read operations or need only provide the data to memory unit 82 for subsequent write operations. Automatic increment block 90 calculates the subsequent addresses for each access. That is, for a typical read operation of a number of successive address locations in memory unit 82, a number of bus transfers over the modified common bus may be eliminated after memory interface 86 is initialized. This may significantly increase the amount of data that may be provided over bus 16.

For a write operation, user 12 may provide an initial address, a data word, and a control word to memory interface block 86. Memory interface block 86 then provides the address, the data word, and the control word to memory element 84 via interface 88. Memory element 84 then writes the data word to the corresponding address location. For subsequent write operations to successive address locations, auto-increment block 90 may automatically increments the address, thereby providing a next address to memory element 84. Further, memory interface block 86 stores the control word for subsequent memory accesses. Thereafter, user 12 need only provide a data word to memory interface block 86 via bus 16 for each subsequent write operation.

For a read operation, user 12 may provide an initial address and a control word to memory interface block 86. Memory interface block 86 then provides the address and the control word to memory element 84 via interface 88. Memory element 84 then reads the corresponding memory address location and provides a resulting data word to memory interface block 86. User 12 then reads the resulting data word from memory interface block 86. For subsequent read operations to successive address locations, auto-increment block 90 automatically increments the address, thereby providing a next address to memory element 84. Further, memory interface block 86 stores the control word for subsequent memory accesses. Thereafter, user 12 need only read subsequent data words from memory interface block 86 for each subsequent read operation.

It is contemplated that auto-increment block 90 may automatically manipulate the address in any predetermined way. For example, the auto-increment block 90 may automatically increment the address, automatically decrement the address, automatically add an integer "IN" to the address, multiply the address by a number "X", or perform any other manipulating means.

Figure 5:
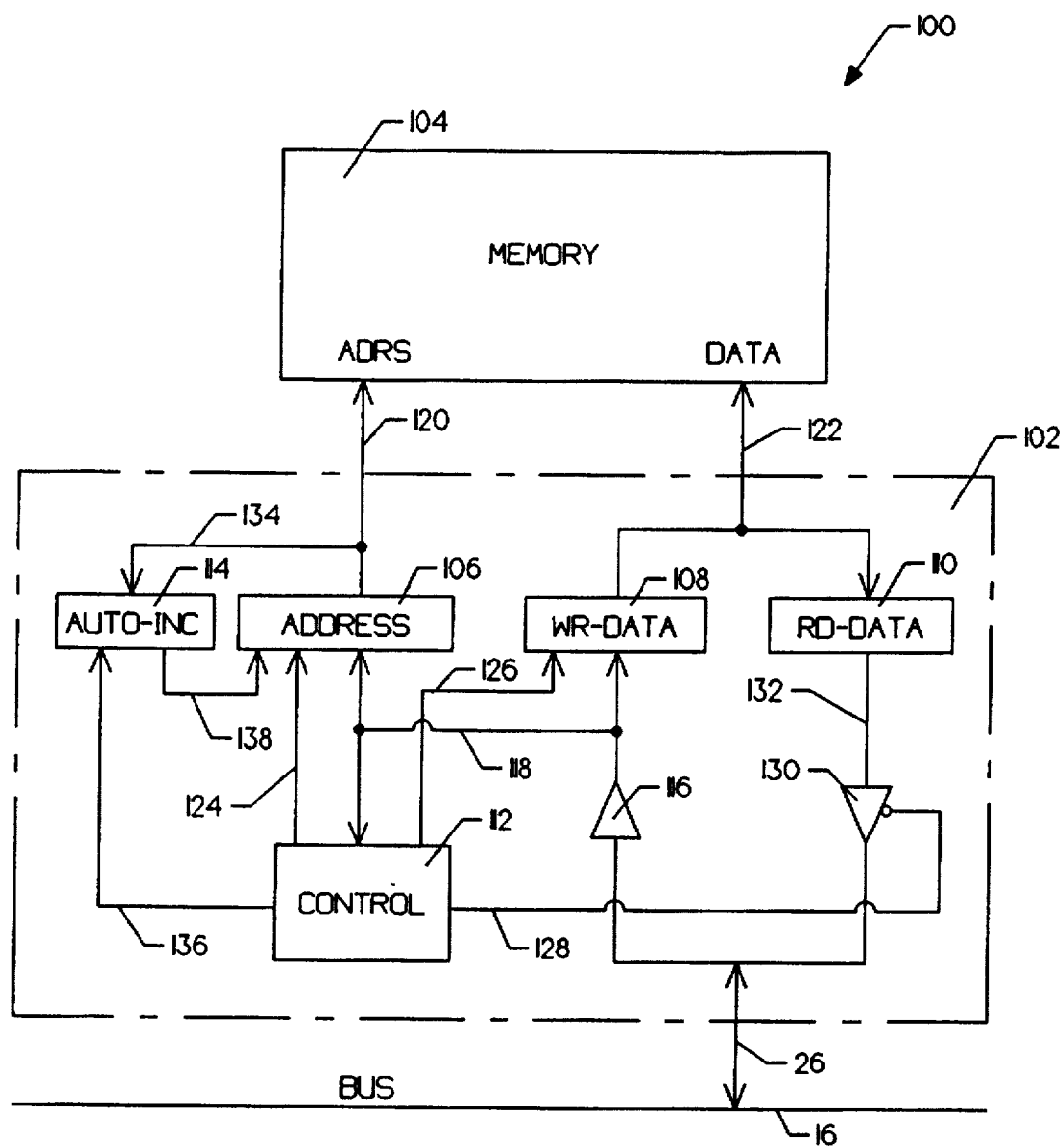
FIG. 5 is a schematic diagram of the memory unit of FIG. 4 wherein the auto-increment block is incorporated into the memory interface block.

FIG. 5 is a schematic diagram of the memory unit of FIG. 4 wherein the auto-increment block is incorporated into the memory interface block. In the exemplary embodiment, memory interface 102 is coupled to bus 16 via interface 26 and is further coupled to memory element 104 via interfaces 120 and 122. Memory interface 102 has an address register 106, a write data register 108, a read data register 110, a control block 112, an auto-increment block 114, and a bi-directional buffer. The bi-directional buffer includes an input buffer 116 and an output buffer 130. Input buffer 116 is coupled to bus 16 via interface 26 and is further coupled to address register 106, write data register 108, and control block 112 via interface 118. Address register 106 is coupled to an address input port of memory element 104 via interface 120. Write data register 108 and read data register 110 are coupled to a data I/O port of memory 104 via interface 122. Read data register 110 is coupled to output buffer 130 via interface 132. Output buffer 130 is coupled to bus 16 via interface 26. Auto-increment block 114 is coupled to the output of address register 106 via interface 134 and is further coupled to an input of address register 106 via interface 138. Auto-increment block 114 reads the value stored in address register 106 via interface 134 and provides an incremented address to address register 106 via interface 138. Finally, control block 112 provides enables to address register 106, write data register 108, auto-increment block 114, and output buffer 130 via interfaces 124, 126, and 128, respectively.

For a read operation, a user provides an address to address register 106 during a first bus transfer. The address contains both a memory address and a number of control bits. A portion of the control bits are provided to control block 112 wherein control block 112 determines if auto-increment block 114 should be enabled thereby automatically incrementing the address for subsequent memory accesses. Address register 106 provides the memory address to memory element 104 wherein memory element 104 reads the corresponding address location and provides a resulting data word to read data register 110. Control block 112 then enables output buffer 130 via interface 128 thereby allowing the user to read the contents of read data register 110 to complete the read operation. Thereafter, if control block 112 determines that auto-increment block 114 is enabled, the address is automatically incremented for subsequent memory accesses. The user need only read the contents of read data register 110 to complete each successive read operation. The user is not required to provide addresses to the memory interface block 102 for the subsequent read operations.

For a write operation, the user provides an address to address register 106 during a first bus transfer. The address contains both an address and a number of control signals. A portion of the control signals are provided to control block 112 wherein control block 112 determines if auto-increment block 114 is to automatically increment the address for subsequent memory accesses. The user may then provide a data word to write data register 108 during a second bus cycle. Address register 106 and write data register 108 then provides the memory address and the write data word to memory element 104 wherein memory element 104 writes the data word to the corresponding address location. Thereafter, if control block 112 determines that auto-increment block 114 is enabled, the value in address register 106 is automatically incremented for subsequent memory accesses. The user need only provide a write data word to write data register 108 to complete each successive write operation. The user is not required to provide an addresses to memory interface block 102 for the subsequent write operations.

Figure 6A:
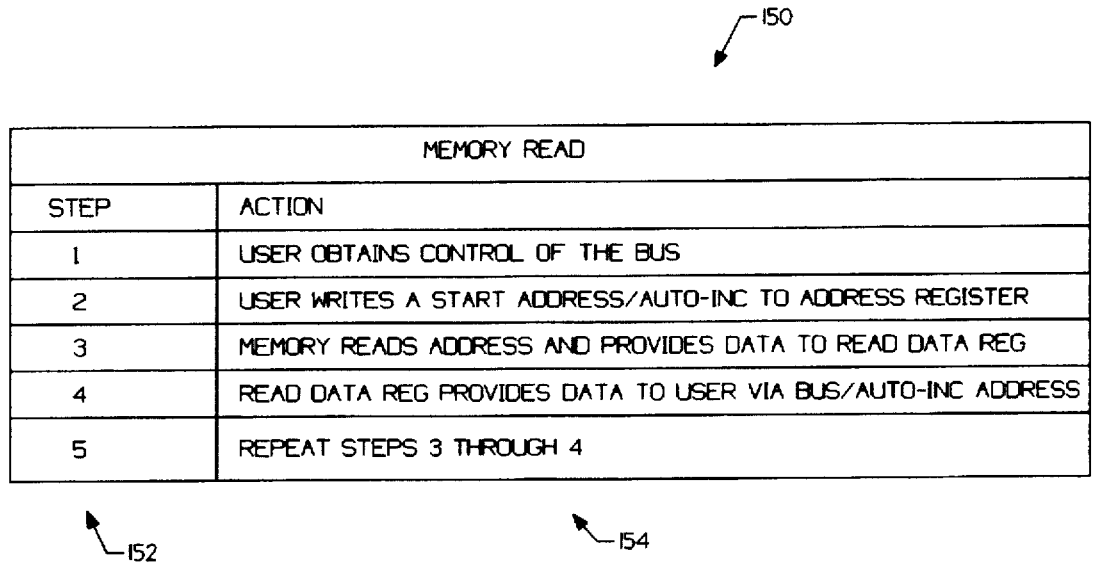
FIG. 6A is a table showing typical steps performed during a number of read operations between a user and a memory unit in accordance with an exemplary embodiment of the present invention.

FIG. 6A is a table showing typical steps performed during a number of read operations between a user and a memory unit in accordance with an exemplary embodiment of the present invention. The table is generally shown at 150. The step number is shown in column 152 while the action performed is shown in column 154. During a first step, a user arbitrates and eventually obtains control of bus 16. During a second step, the user writes a start address/control word to address register 106 via bus 16 (see FIG. 5). The control bits may enable the auto-increment block 114. During a third step, address register 106 provides the address to memory element 104 wherein memory element 104 reads the corresponding address location and provides a resulting read data word to read data register 110. During a fourth step, read data register 110 provides the read data word to the user via bus 16 and the auto-increment block 114 automatically increments the address in address register 106. For subsequent read operations, the third and fourth steps may be repeated.

Figure 6B:
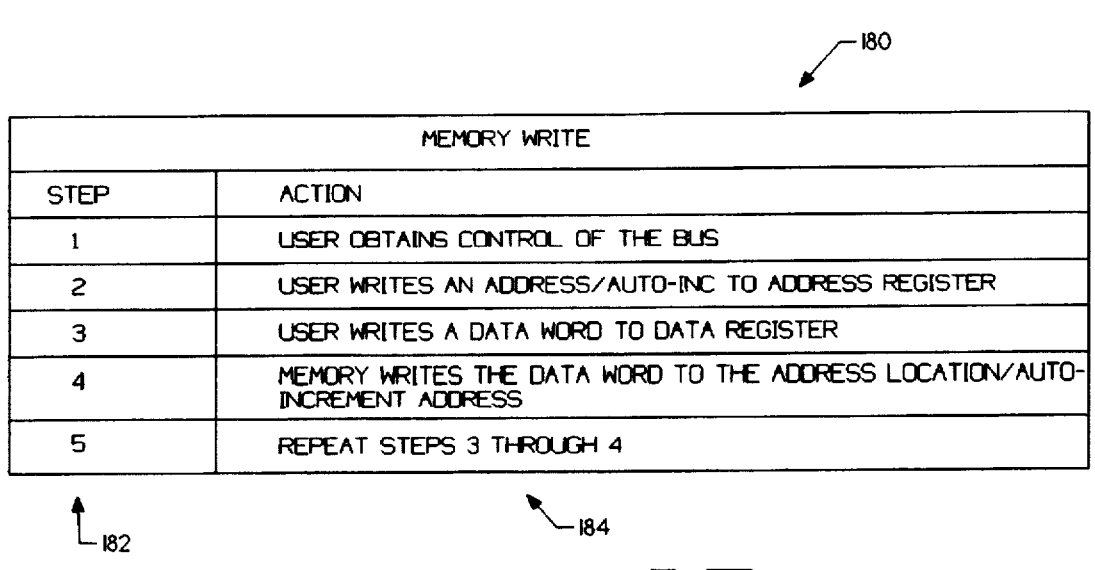
FIG. 6B is a table showing typical steps performed during a number of write operations between a user and a memory unit in accordance with an exemplary embodiment of the present invention.

FIG. 6B is a table showing typical steps performed during a number of write operations between a user and a memory unit in accordance with an exemplary embodiment of the present invention. The table is generally shown at 180. The step number is shown in column 182 while the action performed is shown in column 184. During a first step, a user arbitrates and eventually obtains control of bus 16. During a second step, the user writes an address/control word to address register 106 via bus 16 (see FIG. 5). The control bits may enable the auto-increment block 114. During a third step, the user writes a write data word to write data register 108 via bus 16. During a fourth step, address register 106 and write data register 108 provides the address and the write data word to memory element 104 wherein memory element 104 writes the write data word to the corresponding address location. Thereafter, the autoincrement block 114 automatically increments the address in address register 106. For subsequent write operations, the third and fourth steps may be repeated.

Figure 7:
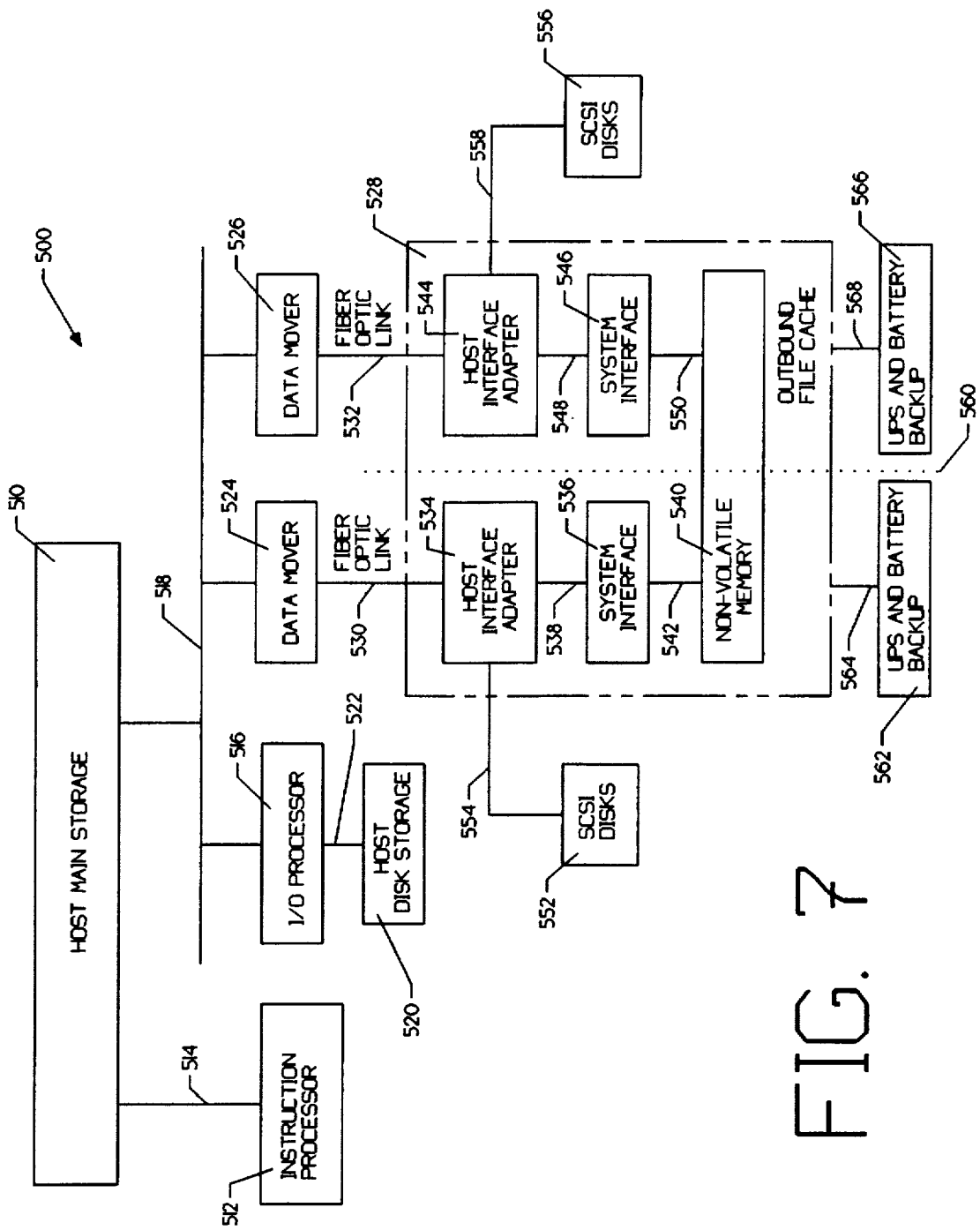
FIG. 7 is a block diagram of the exemplary computer which may utilize the present invention.

FIG. 7 is a block diagram of an exemplary computer system which may utilize the present invention. The block diagram is generally shown at 500. The Extended Processor Complex (XPC) comprises an instruction processor 512, an IO processor 516, a host disk storage 520, an outbound File Cache block 528, and a host main storage 510. Instruction processor 512 receives instructions from host main storage 510 via interface 514. Host main storage 510 is also coupled to MBUS 518. I/O processor 516 is coupled to MBUS 518 and is further coupled to host disk storage 520 via interface 522. In the exemplary embodiment, outbound File Cache block 528 is coupled to MBUS 518 through a first data mover 524 and a second data mover 526. Outbound File Cache block 528 may comprise two separate power domains including a power domain-A powered by a universal power source (UPS) and battery backup power source 562 via interface 564, and a power domain-B powered by a UPS power source and battery backup power source 566 via interface 568. The separation of power domain-A and power domain-B is indicated by line 560. UPS and battery backup blocks 562 and 566 may have a detection means therein to detect when a corresponding primary power source fails or becomes otherwise degradated.

Power domain-A of outbound file cache 528 may comprise a host interface adapter 534, a system interface block 536, and a portion of a nonvolatile memory 540. Host interface adapter 534 is coupled to data mover 524 via fiber optic link 530 and is further coupled to system interface block 536 via interface 538. System interface block 536 is coupled to nonvolatile memory 540 via interface 542, as described above. Similarly, host interface adapter 544 is coupled to data mover 526 via fiber optic link 532 and is further coupled to system interface block 546 via interface 548. System interface block 546 is coupled to nonvolatile memory 540 via interface 550, as described above.

The data is transferred from the host disk storage 520 through I/O processor 516 to host main storage 510. But now, any updates that occur in the data are stored in nonvolatile memory 540 instead of host disk storage 520, at least momentarily. All future references then access the data in nonvolatile memory 540. Therefore, nonvolatile memory 540 acts like a cache for host disk storage 520 and may significantly increases data access speed. Only after the data is no longer needed by the system is it transferred back to host disk storage 520. Data movers 524 and 526 are used to transmit data from the host main storage 510 to the nonvolatile memory 540 and vice versa. In the exemplary embodiment, data movers 524 and 526 perform identical cache functions thereby increasing the reliability of the overall system. A more detailed discussion of the XPC system may be found in the above reference co-pending application, which has been incorporated herein by reference.

In accordance with the present invention, a data save disk system 552 is coupled to host interface adapter 534 via interface 554. Similarly, data save disk system 556 is coupled to host interface adapter 544 via interface 558. Data save disk systems 552 and 556 may comprise Small Computer System Interface (SCSI) type disk drives and host interface adapters 534 and 544, respectively, may provide a SCSI interface thereto. In this configuration, the data elements stored in nonvolatile memory 540 can be downloaded directly to the data save disk systems 552 and 556. This may permit computer system 500 to detect a power failure in a power domain, switch to a corresponding backup power source 562 or 566, and store all of the critical data elements stored in nonvolatile memory 540 on SCSI disk drives 552 or 556 before the corresponding backup power source 562 or 566 also fails.

The primary power sources may comprise a universal power source (UPS) available from the assignee of the present invention. The backup power sources may comprise a limited power source, like a battery. Typical batteries may provide power to a computer system for only a limited time. For some computer systems, a large battery or multiple batteries may be required to supply the necessary power. Further, because the power requirements of some computer systems are substantial, the duration of the battery source may be very limited. It is therefore essential that the critical data elements be downloaded to a corresponding data save disk system 552 or 556 as expediently as possible.

In the exemplary embodiment, backup power source 562 only powers a first portion of nonvolatile memory 540, host interface adapter 534, system interface 536, and data save disk system 552. Similarly, backup power source 566 only powers a second portion of nonvolatile memory 540, host interface adapter 544, system interface 546, and data save disk system 556. In this configuration, the remainder of computer system 500, including instruction processor 512, I/O processor 516, host main storage 510, and host disk storage 520, is not powered after the primary power source fails. This allows backup power sources 562 and 566 to remain active for a significantly longer period of time thereby allowing more data to be downloaded from nonvolatile memory 540. In this embodiment, host interface adapters 534 and 544 have circuitry to support the downloading of the critical data elements to the SCSI disk drives 552 and 556, without requiring any intervention by instruction processor 512 or I/O processor 516.

Coupling data save disk systems 552 and 556 directly to host interface adapters 534 and 544, respectively, rather than to instruction processor 512 or I/O processor 516 may have significant advantages. As indicated above, it may be faster to download the data elements directly from nonvolatile memory 540 to data save disk systems 552 or 556, rather than providing all of the data to I/O processor 516 and then to host disk storage 520. Further, significant power savings may be realized by powering only the blocks in outbound file cache 528 and the corresponding data save disk systems 552 or 556, thereby allowing more data to be downloaded before a corresponding backup power source 562 or 566 fails. Finally, data save disk systems 552 and 556 may be dedicated to storing the data elements in nonvolatile memory 540 and thus may be appropriately sized.

In a preferred mode, once the data save operation has begun, it continues until all of the data in nonvolatile memory 540 has been transferred to the data save disk system. Thereafter, the data save disks are spun down and the outbound file cache 528 is powered down to minimize further drain on the battery backup power source. If the primary power source comes back on during the data save operation, the data save is still completed, but the outbound file cache 528 is not powered down. When primary power is restored, the operation of computer system 500 may be resumed beginning with a data restore operation, but only after the battery backup power source has been recharged to a level which could sustain another primary power source failure.

The data restore operation occurs after normal computer system 500 initialization, including power-up, firmware load, etc. However, before a data restore operation is allowed to begin, the presence of saved data on a corresponding data save disk must be detected. Prior to initiating the data restore operation, the USBC microcode (see FIG. 8) compares the present computer system 500 configuration with the configuration that was present when the data save operation was executed. If the two configurations are not an exact match, the data restore operation is not executed and an error is indicated.

A data save disk set may be added to the outbound file cache 528 as a single or redundant configuration. A single data save set may save one copy of the nonvolatile memory 540 contents, and is used when there is only one Universal Power Source (UPS) 562 driving the outbound file cache 528 and data save disks. A redundant data save disk configuration may have two data save disk sets (as shown in FIG. 7) and may save two copies of the nonvolatile memory contents. In the redundant configuration, one set of data save disk drives may be powered from one UPS while the another set of data save disk drives may be powered by another UPS.

Figure 8:
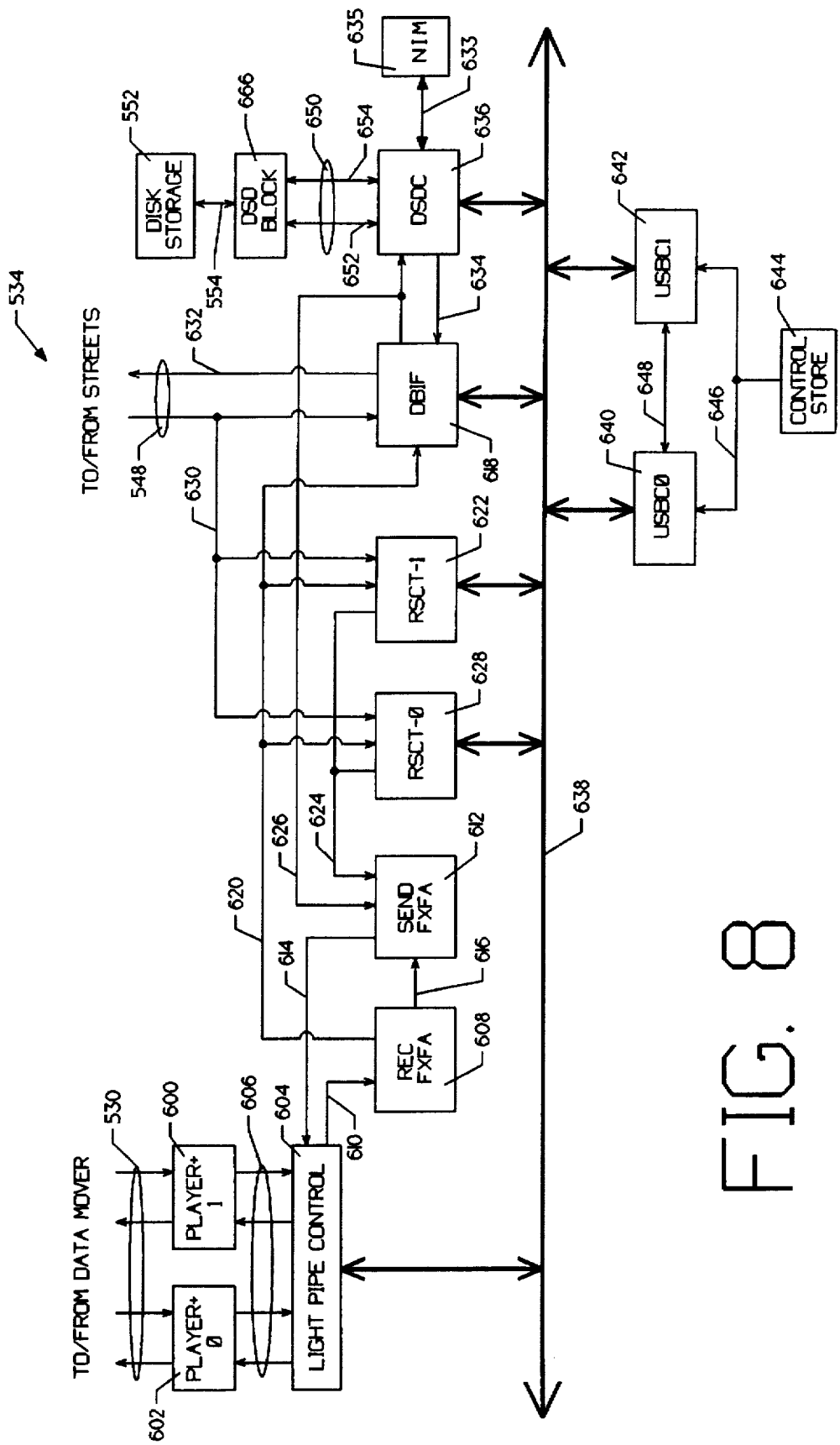
FIG. 8 is a schematic diagram of an exemplary embodiment of the host interface adapter block.

FIG. 8 is a schematic diagram of an exemplary embodiment of the host interface adapter block. For illustration, Host Interface Adapter (HIA) 534 of FIG. 7 is shown. It is recognized that HIA 544 may be similarly constructed. HIA 534 includes two Microsequencer Bus Controllers (USBC) 640, 642 which are connected to a control store 644 via interface 646. The USBC's 640, 642 access the HIA stations 628, 622, 618, and 636 via a micro bus 638. A player+0 602 and a player+1 600 receive frames (or data elements) over fiber optic link 530. The term player+ refers to a fiber optic interface controller available from National Semiconductor which is called the Player Plus Chip Set. Player+0 602 forwards its frame to light pipe control 604 via interface 606. Similarly, player+1 600 forwards its frame to light pipe control 604 via interface 606. Light pipe control 604 transfers the frames to a Receive Frame Transfer Facility (REC FXFA) 608 via interface 610. REC FXFA 608 unpacks the frames and stores control information in a Request Status Control Table-0 (RSCT-0) 628 and a RSCT-1 622 via interface 620. RSCT-0 628 and RSCT-1 622 monitor the data that has been received from a corresponding data mover. The data which was contained in the frame received by REC FXFA 608 is sent to the Database Interface (DBIF) station 618 via interface 620. DBIF 618 forwards the data over interface 632 to the streets.

Data received by the DBIF 618 from the streets via interface 548, is sent to the Send Frame Transfer Facility (SEND FXFA) 612 via interface 626. Control information received via interface 630 is sent to RSCT-0 628 and RSCT-1 622. SEND FXFA 612 takes the data and the control information provided by RSCT-0 628 and RSCT-1 622 via interface 624, and formats a frame for transmission by light pipe control 604. Acknowledgements from REC FXFA 608 are provided to SEND FXFA 612 via interface 616. The frame is forwarded to light pipe control 604 via interface 614. Light pipe control 604 creates two copies of the frame received by SEND FXFA 612, and provides a first copy to player+0 602 and a second copy to player+1 600 via interface 606. The frames are then transmitted over the fiber optic links 530 to a corresponding data mover.

Referring back to control store 644, control store 644 is used to store the instructions that are executed by USBCO 640 and USBC1 642. Control store 644, although in reality a RAM, is used as a read-only memory (ROM) during normal operation. Control store 644 may comprise seven (7) SRAM devices (not shown). Each SRAM device may hold 32*1024 (K) 8-bit bytes of data. Each unit of data stored in control store 644 may comprise 44 bits of instruction, 8 bits of parity for the instruction, and 2 bits of address parity.

Control store 644 may be loaded with instructions at system initialization by a support computer system through a maintenance path (not shown). The parity bits and address bits are computed by a host computer system and appended to each instruction as it is stored. Later, as USBCO 640 and USBC1 642 read and execute the instructions, each instruction is fetched from control store 644 and parity values are computed from it. Each USBC compares the parity values computed against the parity checks stored in control store 644. If there are any discrepancies, control store 644 is assumed to be corrupted and an internal check condition is raised in the corresponding USBC's.

USBCO 640 and USBC1 642 are special purpose microprocessors that execute instructions to monitor and control the transfer of data on micro bus 638. There are two USBC's in the system to ensure that all data manipulations are verified with duplex checking. One of the USBC's 640 is considered to be the master while the other USBC1 642 is considered the slave. Only the master USBCO 640 drives the data on the micro bus 638, but both master USBCO 640 and slave USBC1 642 drive address and control signals to lower the loading on micro bus 638. The slave USBC1 642 sends the result of each instruction to the master USBCO 640 via interface 648. The master USBCO 640 then compares this value to the result it computed. If the values are different, an internal check error condition is set and the program is aborted. A further discussion of the operation of HIA 534 may be found in the above referenced co-pending application, which is incorporated herein by reference.

In accordance with the present invention, a data save disk controller (DSDC) 636 is coupled to micro bus 638 and communicates with USBCO 640 and USBC1 642. DSDC 636 is further coupled to DBIF 618 via interfaces 634 and 626. DSDC receives data elements from DBIF 618 via interface 626 and provides data elements to DBIF 618 via interface 634. DSDC 636 is further coupled to a DSD block 666 via a DSD bus 650. In the exemplary embodiment, DSDC 636 is coupled to DSD block 666 via a DSD address bus 652, a DSD data bus 654, and a number of control signals. DSD block 666 is coupled to a data save disk system 552 via interface 554. DSD block provides the interface function between DSDC 636 and data save disk system 552. A network interface module (NIM) 635 is coupled to DSDC 636 via interface 633. NIM 635 provide maintenance functions to DSDC 636, and to other elements within the system. USBCO 640 and USBC1 642 may control the operation of a download and/or upload operation between a nonvolatile memory 540 and data save disk system 552. This may include providing a timer function to delay the download and/or upload operation for a predetermined time period.

In this configuration, data save disk system 552 is directly coupled to nonvolatile memory 540 via DSD block 666, DSDC 636, DBIF 618, and system interface 536 (see FIG. 7). When a primary power source fails, the data elements stored in nonvolatile memory 540 are downloaded directly to the data save disk system 552 without any intervention by an instruction processor 512 or I/O processor 516. This configuration may have a number of advantages. First, the speed at which the data elements may be downloaded from nonvolatile memory 540 to data save disk system 552 may be enhanced due to the direct coupling therebetween. Second, significant power savings may be realized because only HIA 534, data save disk system 552, system interface 536, and non-volatile memory 540 need to be powered by the secondary power source to effect the download operation. This may significantly increase the amount of time that the secondary power source may power the system thereby increasing the number of data elements that can be downloaded.

Similarly, once the primary power source is restored, data save disk system 552 uploads the data elements directly to nonvolatile memory via DSD block 666, DSDC 636, DBIF 618, and system interface block 536, without any assistance from an instruction processor 512 or I/O processor 516. This may provide a high speed upload link between data save disk system 552 and nonvolatile memory 540.

Figure 9:
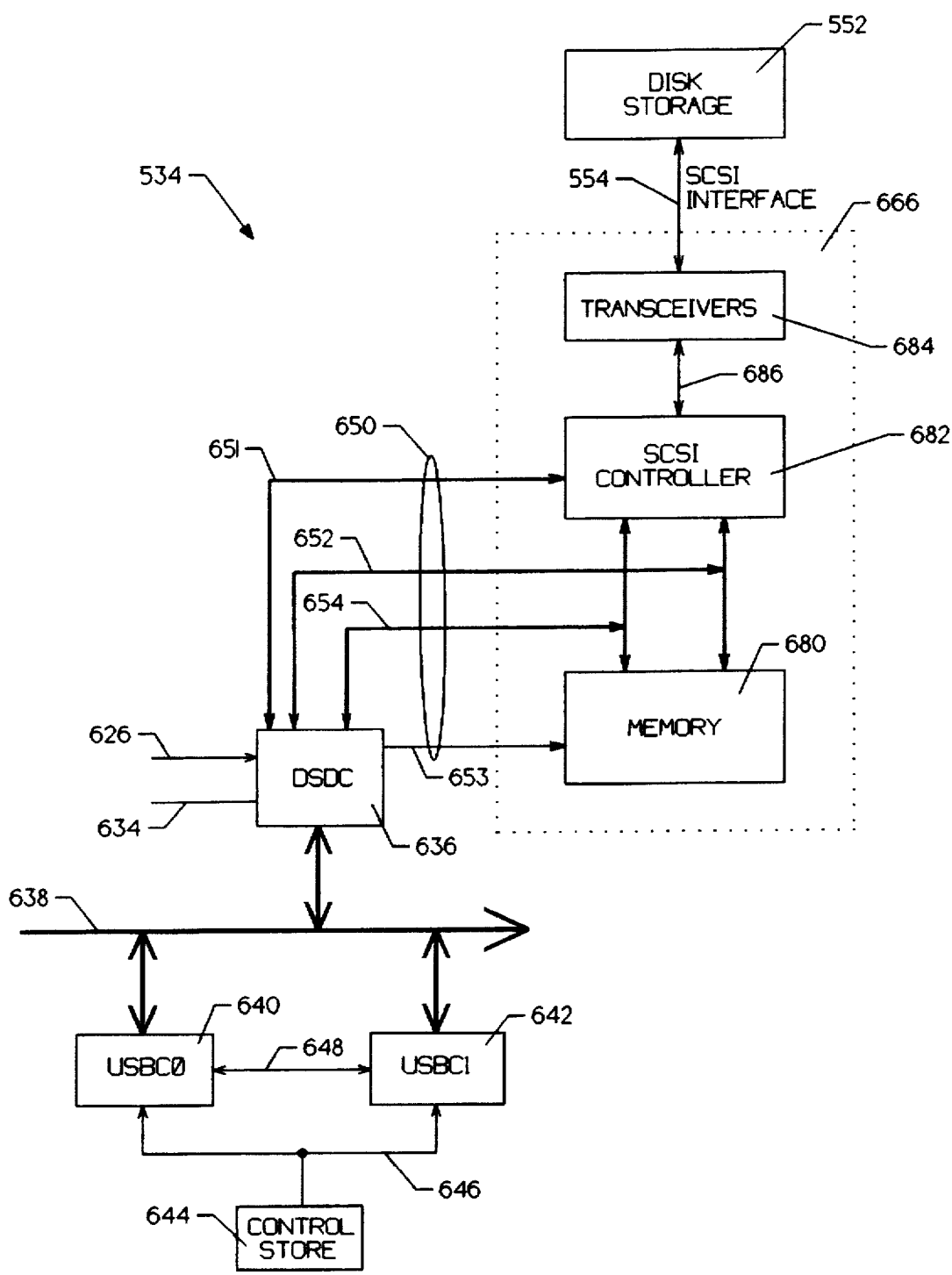
FIG. 9 is a partial schematic diagram of the host interface adapter block detailing the data save disk interface.

FIG. 9 is a partial schematic diagram of the host interface adapter block detailing the data save disk interface. DSD block 666 includes a memory 680, a disk controller 682, and a set of transceivers 684. A DSD bus 650 may couple DSDC 636, memory 680, and disk controller 682, and may comprise an address bus 652, and a data bus 654. DSD bus 650 further includes a number of disk controller control signals 651, and a number of memory control signals 653. DSD bus 650 operates generally in accordance with a standard master/slave bus protocol wherein the DSDC 636, disk controller 682, and memory 680 are slave devices, but only DSDC 636 and disk controller 682 are master devices. That is, memory 680 may not be a master device in the exemplary embodiment.

Disk controller 682 may be coupled to transceivers 684 via interface 686. Transceivers 684 is coupled to data save disk system 552 via interface 554. In a preferred mode, interface 554 may be a SCSI interface. Disk controller 682 may be a SCSI disk controller and data save disk storage system 552 may comprise at least one SCSI disk drive. In a preferred embodiment, disk controller 682 may be a NCR53C720 SCSI I/O Processor currently available from NCR corporation. Further, the at least one SCSI disk drives of data save disk storage 552 may comprise Hewlett Packard C3010 5.25" drives, Fijitsu M2654 5.25" drives, or Seagate ST12550/ND 3.5" drives. The data save disk system may comprise a set of 2-GByte SCSI Disks in sufficient quantity to store a single copy of the entire contents of the XPC. The NCR I/O processor may provide the necessary SCSI interface between DSDC 636 and the at least one disk drives of data save disk system 552.

As indicated with reference to FIG. 8, USBC0 640 and USBC1 642 are coupled to MBUS 638. Further, USBCO 640 and USBC1 642 are coupled to control store 644 via interface 646. DSDC 636 is coupled to micro bus 638, DBIF 618, and DSD block 666.

Memory 680 may comprise at least one RAM device. In a preferred mode, memory 680 comprises four RAM devices. Because the disk storage system is an addition to an existing HIA design, control store 644 may not have enough memory locations to store the added pointers and temporary data needed to support the data save disk function. Therefore, a primary function of memory 680 is to store the pointers and temporary data for USBCO 640 and USBC1 642 such that HIA 534 may support the disk data save function. Another primary function of memory 680 is to store SCRIPTS for disk controller 682. SCRIPT programs and the application thereof are discussed in more detail below. Additions to the USBC microcode which may be stored in memory 680 may provide the following functionality: (1) initialization of the data save disk system 552 and microcode control areas; (2) data save operation which copy all of the data and control elements from nonvolatile memory 540 to data save disk system 552; (3) data restore operation which copy all of the data and control elements from data save disk system 552 to nonvolatile memory 540; (4) checking the status of the disks in data save disk storage system 552 and informing maintenance if restore data exists thereon; and (5) various error detection and error handling subroutines.

As indicated above, USBCO 640 and USBC1 642 read pointers and/or temporary data or the like from memory 680 through DSDC 636. To accomplish this, USBC0 640 and USBC1 642 may provide an address to DSDC 636 wherein DSDC 636 arbitrate and obtain control of DSD bus 650. Once this has occurred, DSDC 636 provides the address to memory 680. Memory 680 then reads the corresponding address location and provides the contents thereof back to DSDC 636 via DSD bus 650. DSDC 636 then provides the pointers and/or temporary data or the like to USBCO 640 and USBC1 642 for processing. By using this protocol, USBCO 640 and USBC1 642 obtain pointers and/or temporary data from memory 680 to control the operation of a download and/or upload operation between nonvolatile memory 540 and data save disk system 552. This may include providing a timer function to delay the download and/or upload operation for a predetermined time period.

Data save disk system 552 is directly coupled to nonvolatile memory 540 via DSD block 666, DSDC 636, DBIF 618, and system interface 536 (see FIG. 7). When a primary power source fails, and under the control of USBCO 640 and USBC1 642, DBIF 618 reads the data elements from nonvolatile memory via interface 630 wherein DBIF 618 provides the data elements to DSDC 636 via interface 626. DSDC 636 then performs arbitration for DSD bus 650, wherein the data elements are read by disk controller 682. In this instance, disk controller 682 is the bus master. Disk controller 682 then provides the data elements to transceivers 684 wherein the data elements are written to data save disk system 552. This configuration may have a number of advantages. First, the speed at which the data elements may be downloaded from nonvolatile memory 540 to data save disk system 552 may be enhanced due to the direct coupling therebetween. Second, significant power savings may be realized because only HIA 534, system interface 536, nonvolatile memory 540, and data save disk system 552 need to be powered by the secondary power source to effect the download operation. This may significantly increase the amount of time that the secondary power source may power the system thereby increasing the number of data elements that may be downloaded.

Similarly, once the primary power source is restored, data save disk system 552 may upload the data elements directly to nonvolatile memory via DSD block 666, DSDC 636, DBIF 618, and system interface block 536, without any assistance from an instruction processor 512 or I/O processor 514. This may provide a high speed upload link between data save disk system 552 and nonvolatile memory 540.

Figure 10A:
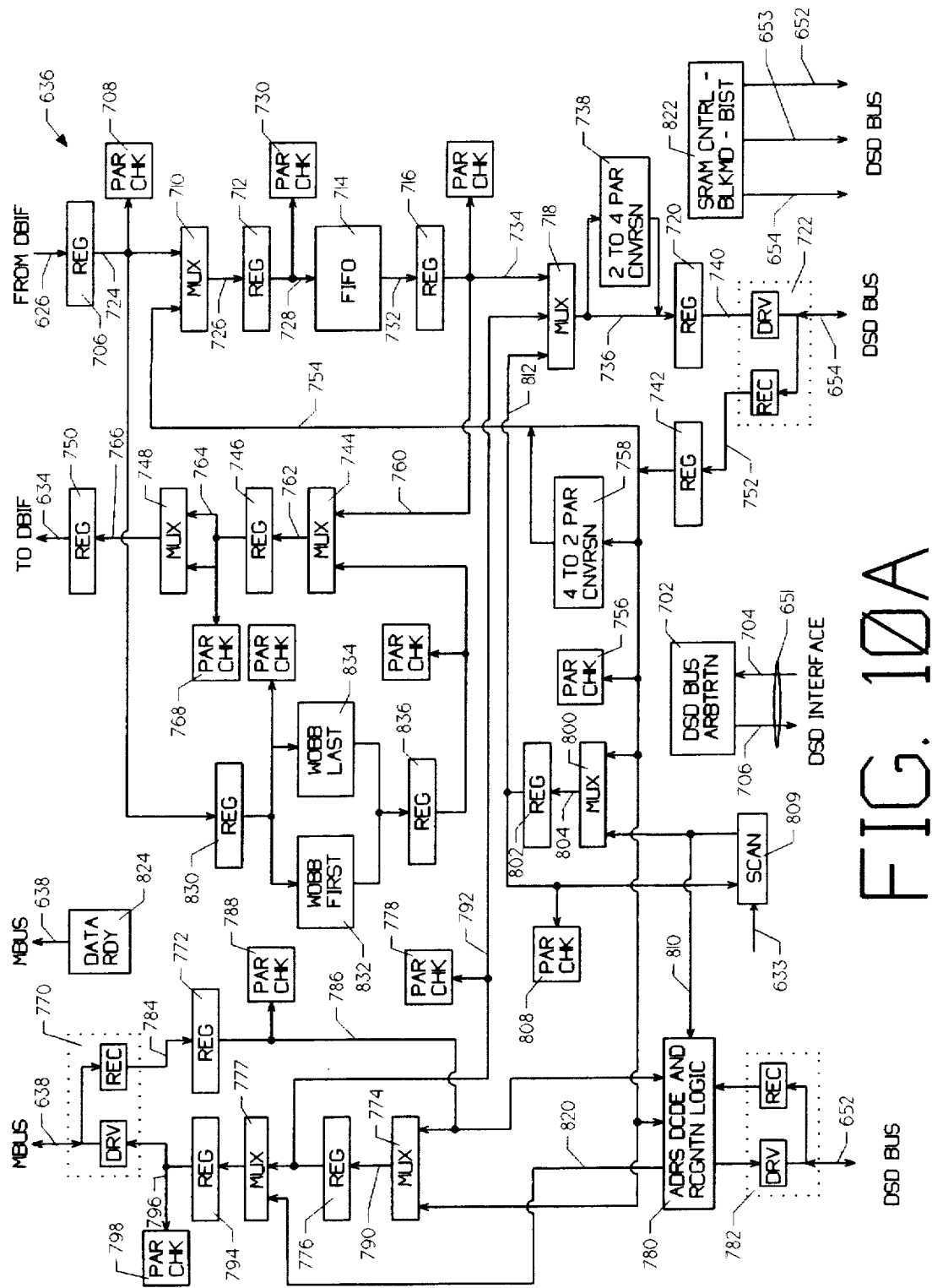
FIG. 10A is a block diagram of the Data Save Disk Chip (DSDC) shown in FIGS. 8–9.

FIG. 10A is a block diagram of the Data Save Disk Controller (DSDC) shown in FIGS. 8-9. The block diagram is generally shown at 636. DSDC 636 includes a DSD bus arbitration and control block 702 which controls the arbitration of DSD bus 650. DSD bus arbitration and control 702 determines which device may assume the role of bus master of DSD bus 650. Preemptive priority is used to determine which device becomes bus master when more than one device is requesting bus mastership at any given time. In the exemplary embodiment, the priority order of bus mastership, from high priority to low priority, is as follows: disk controller 682, USBC blocks 640, 642, and finally network interface module (NIM) 635. Memory 680 is not allowed to assume bus mastership of DSD bus 650 in the exemplary embodiment. DSD bus arbitration and control block 702, is coupled to disk controller 682 via interface 651 (see FIG. 9). Interfaces 704 may be a bus request from disk controller 682 and interface 706 may be a bus acknowledge signal to disk controller 682.

In an exemplary embodiment, when disk controller 682 assumes bus mastership, it relinquishes bus ownership after a maximum of 16 bus cycles. Disk controller 682 then waits 5 clock cycles before asserting a bus request to regain bus mastership. The 5 clock cycles provides a "fairness" delay to allow DSDC 636 to gain bus mastership if required.

DSDC 636 includes at least four basic data paths. A first basic data path provides an interface between DBIF 618 and DSD bus 650. This path includes a register 706, a multiplexer 710, a register 712, a FIFO block 714, a register 716, a multiplexer 718, a data-out-register 720, and an I/O buffer block 722. Register 706 receives data elements from DBIF 618 via interface 626. Register 706 is coupled to multiplexer 710 via interface 724. Also coupled to interface 724 is a parity check block 708. Parity Check block 708 may check the parity of a data element as it is released from register 706.

Multiplexer 710 selects interface 724 when transferring data between DBIF 618 and DSD bus 650. The data is then provided to register 712 via interface 726 wherein register 712 may stage the data for FIFO 714. The data is then provided to FIFO 714 via interface 728. Also coupled to interface 728 is a parity check block 730. Parity Check block 730 may check the parity of a data element as it is released from register 712.

FIFO 714 may comprise a 34 bit by 64 word FIFO. FIFO 714 functions as a buffer between DBIF 618 and DSD bus 650. This may be desirable because disk controller 682 may have to arbitrate for DSD bus 650, thus causing an unpredictable delay. FIFO 714 stores the data that is transferred by DBIF 618 to DSDC 636 until disk controller 682 is able to gain control of DSD bus 650. Once disk controller 682 gains access to DSD bus 650, FIFO 714 waits for eight (8) words to be transferred from DBIF 618 to FIFO 714 before sending the data over DSD bus 650.

Once released by FIFO 714, the data is provided to register 716 via interface 732. Register 716 stores the output of FIFO 714. The data is then provided to multiplexer 718 via interface 734. Multiplexer 718 selects interface 734 when transferring data between DBIF 618 and DSD bus 650. The data is then provided to data-out-register 720 via interface 736, wherein data-out-register 720 stages the data for I/O buffer block 722. Parity conversion block 738 provides a two to four bit parity conversion. That is, data arriving from DBIF 618 via multiplexer 718 may only have two parity bits associated therewith. It may be desirable to convert the two parity bits to a four parity bit scheme. Data-out-register 720 then provides the data to I/O buffer block 722 via interface 740. I/O buffer block 722 includes a plurality of bi-directional transceivers wherein each of the transceivers may be enabled to drive the data onto DSD bus 650 via interface 654.

A second basic data path of DSDC 636 provides an interface between DSD bus 650 and DBIF 618. This path includes I/O buffer block 722, a data-in-register 742, multiplexer 710, register 712, FIFO block 714, register 716, a multiplexer 744, a register 746, a multiplexer 748, and a register 750. For this data path, I/O buffer block 722 is enabled to accept data from DSD bus 650 and provide the data to data-in-register 742 via interface 752. Data-in-register 742 provides the data to multiplexer 710 via interface 754. Also coupled to interface 754 is a parity check block 756. Parity Check block 756 may check the parity of a data element as it is released by data-in-register 742. Parity conversion block 758 may provide a four to two bit parity conversion. That is, data arriving from DSD bus 650 may have four parity bits associated therewith while DBIF interface 634 may only have two parity bits associated therewith. It may be desirable to convert the four parity bits to a two parity bit scheme.

Multiplexer 710 selects interface 754 when transferring data between DSD bus 650 and DBIF 618. The data is then provided to register 712 via interface 726 wherein register 712 stages the data for FIFO 714. The data is then provided to FIFO 714 via interface 728. Also coupled to interface 728 may be parity check block 730. Parity Check block 730 may check the parity of a data element as it is released from register 712.

FIFO 714 functions as a buffer between DSD bus 650 and DBIF 618. This is desirable because DBIF 618 may have to wait to gain access to the streets via interface 632. FIFO 714 stores data that is transferred by DSD bus 650 until DBIF 618 can gain access to the streets.

Once released by FIFO 714, the data is provided to register 716 via interface 732. Register 716 stores the output of FIFO 714. The data is then provided to multiplexer 744 via interface 760. Multiplexer 744 selects the data provided by register 716 during a data transfer between DSD bus 650 and DBIF 618. Multiplexer 744 then provides the data to register 746 via interface 762. Register 746 then provides the data to multiplexer 748 via interface 764. Multiplexer 748 selects 16 bits at a time of a 32 bit word provided by register 746. This may be necessary because the DSD bus may comprise a 32 bit word while the interface to DBIF 618 may only be 16 bits wide. Also coupled to interface 764 may be parity check block 768. Parity Check block 768 may check the parity of a data element as it is released from register 746. Multiplexer 748 then provides the data to register 750. Register 750 provides the data to DBIF 618 via interface 634.

A third basic data path of DSDC 636 provides an interface between MBUS 638 and DSD bus 650. This path includes I/O buffer block 770, a register 772, an address decode and recognition logic block 780, a multiplexer 774, a register 776, multiplexer 718, data-out-register 720, and I/O buffer block 722. For this data path, USBC's 640, 642 provide a request to DSDC 636 via MBUS 638. The request includes a data word, an address, and/or a number of control signals. In the exemplary embodiment, a request comprising an address and a number of control signals is provided over MBUS 638 first wherein a data word follows on MBUS 638, if appropriate. I/O buffer block 770 receives the request via interface 638 and provides the request to register 772 via interface 784. Register 772 provides the request to multiplexer 774 and to an address decode and recognition block 780 via interface 786. Also coupled to interface 786 may be a parity check block 788. Parity Check block 788 may check the parity of the request as it is released from register 772. Multiplexer 774 selects interface 786 during transfers from MBUS 638 to DSD bus 650. Multiplexer 774 provides the request to register 776 via interface 790. Register 776 then provides the request to multiplexer 718 via interface 792. Also coupled to interface 792 may be a parity check block 778. Parity Check block 778 may check the parity of the request as it is released from register 776.

Multiplexer 718 selects interface 792 when transferring data between MBUS 618 and DSD bus 650. Multiplexer 718 provides the data word to data-out-register 720 via interface 736 wherein data-out-register 720 stages the data word for I/O buffer block 722. Parity conversion block 738 provides a two to four bit parity conversion. That is, data arriving from MBUS 638 via multiplexer 718 may only have two parity bits associated therewith. It may be desirable to convert the two parity bits to a four parity bit scheme. Data-out-register 720 then provides the data word to I/O buffer block 722 via interface 740. I/O buffer block 722 may be enabled to drive the data word onto DSD bus 650 via interface 654.

A fourth basic data path of DSDC 636 provides an interface between DSD bus 650 and MBUS 638. This path includes I/O buffer block 722, data-in-register 742, parity conversion block 758, multiplexer 774, a multiplexer 777, register 776, a register 794, and I/O buffer block 770. I/O buffer block 722 receives a data element from DSD bus 650. In an exemplary embodiment, the data element include pointers and/or temporary data requested by USBCO 640 or USBC1 642 from memory 680. I/O buffer block 722 provides the pointers and/or temporary data to data-in-register 742 via interface 752. Data-in-register 742 provides the pointers and/or temporary data to parity conversion block 758 via interface 754. Parity conversion block 758 may provide a four to two bit parity conversion thereof. Parity conversion block 758, and register 742 may then provide the pointers and/or temporary data to multiplexer 774 via interface 754. Multiplexer 774 selects interface 754 when transferring data between DSD bus 650 and MBUS 638. Multiplexer 774 then provides the pointer and/or temporary data to register 776 via interface 790. Register 776 provides the pointers and/or temporary data to multiplexer 777 via interface 792. Multiplexer 777 selects interface 792 when transferring data between DSD bus 650 and MBUS 638. Multiplexer 777 provides the pointers and/or temporary data to register 794. Register 794 provides the pointers and/or temporary data to I/O buffer block 770 via interface 796. Also coupled to interface 796 may be a parity check block 798. Parity Check block 798 may check the parity of the data as it is released from register 794. I/O buffer block 770 may provide the pointers and/or temporary data to USBCO 640 or 642 via MBUS 638.

USBCs 640 and 642 do not interface directly with DSD bus 650 but rather may access memory 680 and disk controller 682 indirectly using registers in DSDC 636. For example, when USBCO 640 performs a read of memory 680, it initiates the transfer by writing a DSDC register 772 with the requested address. Register 772 provides the address to address recognition logic block 780 via interface 786. The address then is provided to register 773 (see FIG. 10B). Register 773 then provides the address to multiplexer 852. Multiplexer 852 selects the output of register 773 when transferring an address from USBCO 640 to memory 680. Multiplexer 852 then provides the address to address register 856 via interface 858.

DSDC 636 then performs bus arbitration, and provides the address to memory 680 via I/O transceiver block 782. Memory 680 then provides the requested data on DSD bus 650. DSDC 636 may then read the data on DSD bus 650 and provide the result to MBUS 638. Referring to FIG. 10A, register 742 receives the read data word and may provide the read data word to multiplexer 774 via interface 754. Multiplexer 774 then provides the read data word to register 776 wherein register 776 provides the read data word to multiplexer 777. Multiplexer 777 then provides the read data word to register 794 wherein the read data word is provided to USBCO 640 via I/O buffer 770. Depending on whether an address or a data word is provided by USBC0 640 via MBUS 638, the corresponding address or data element is routed to the appropriate location within DSDC 636.

In addition to providing the above reference data paths, DSDC 636 may provide a number of other functions. For example, logic may be provided to allow a test function of memory 680 and disk controller 682. For example, DSDC 636 may have a dynamic scan register 809 which may be coupled to NIM 635 via interface 633. NIM 635 may scan in an address and a function code into dynamic scan register 809. The address may then be provided to address register 851 (see FIG. 10B) within address decode and recognition logic block 780 via interface 810. Register 851 may provide the address to address output register 856 via multiplexer 852.

For a dynamic read operation of memory 680, the address is an initial read address which is scanned into dynamic scan register 809 as described above. Thereafter, the address is automatically incremented by an auto-increment block 826 (see FIG. 10B) such that a number of successive read operations may be made to memory 680. After the initial address is provided, NIM 635 provides a control word to dynamic scan register 809. The control word includes a word count and a function code. For a read operation, the function code indicates a read function. The word count is latched into a word count register 853 (see FIG. 10B) wherein after each read operation, the word count register is decremented. When the word count register reaches a value of zero, DSDC 636 terminates the above referenced read operation. For each read operation performed, the resulting data is latched into data-in-register 742. A multiplexer 800 then selects interface 754 thereby storing the resulting data into register 802. The data is then provided to dynamic scan register 809 via interface 812. The resulting data is then scanned out of dynamic scan register 809 via NIM 635 for analysis.

For a write operation, the address is an initial write address and function code which is scanned into dynamic scan register 809 as described above. Thereafter, the address is automatically incremented by an auto-increment block 826 (see FIG. 10B) such that a number of successive write operations may be made to memory 680. For a write operation, the function code indicates a write function. For each write operation performed, a corresponding data word is scanned into dynamic scan register 809. The data word is provided to multiplexer 800 wherein multiplexer 800 provides the data word to register 802. Register 802 provides the data word to multiplexer 718 via interface 812. Multiplexer 718 provides the data word to data-out-register 720 via interface 736 wherein data-out-register 720 stages the data word for I/O buffer block 722. Data-out-register 720 then provides the data word to I/O buffer block 722 via interface 740. I/O buffer block 722 may be enabled to drive the data word to memory 680 via interface 654. The exemplary read and write operations discussed above may be used to perform tests on memory 680 and/or disk controller 682.

Another exemplary function that may be provided by DSDC 636 may be to support a partial block update function provided by host interface adapter 534. That is, in the exemplary system, a file includes a plurality of segments and each of the plurality of segments includes a plurality of blocks. Each of the blocks includes a plurality of words. When a host processor only updates a portion of a file, it may be advantages to only over-write the affected portions of the file to non-volatile memory 540. The host interface adapter block 534 supports the partial block update function. However, some of the supporting logic is located on DSDC ASIC 636. The partial block update function may increase the performance of the file caching system.

Register 830, wobb first block 832, wobb last block 834, and register 836 support the partial block update function of the host interface adapter 534. A further discussion of the partial block update function may be found in the above referenced co-pending U.S. patent application Ser. No. 08/172,663, which is incorporated herein by reference.

SRAM control-block mode-and bist block 822 may provide a number of functions. For example, SRAM control-block mode-and bist block 822 may provide a number of control signals to memory 680 via interface 653. Other exemplary function may be to provide error detection and test to memory 680.

Finally, DSDC 636 may provide a data ready block 824 which may be coupled to MBUS 638. Data ready block 824 may indicate to USBC 640,642 when a corresponding read operation has been completed by DSDC 636.

Figure 10B:
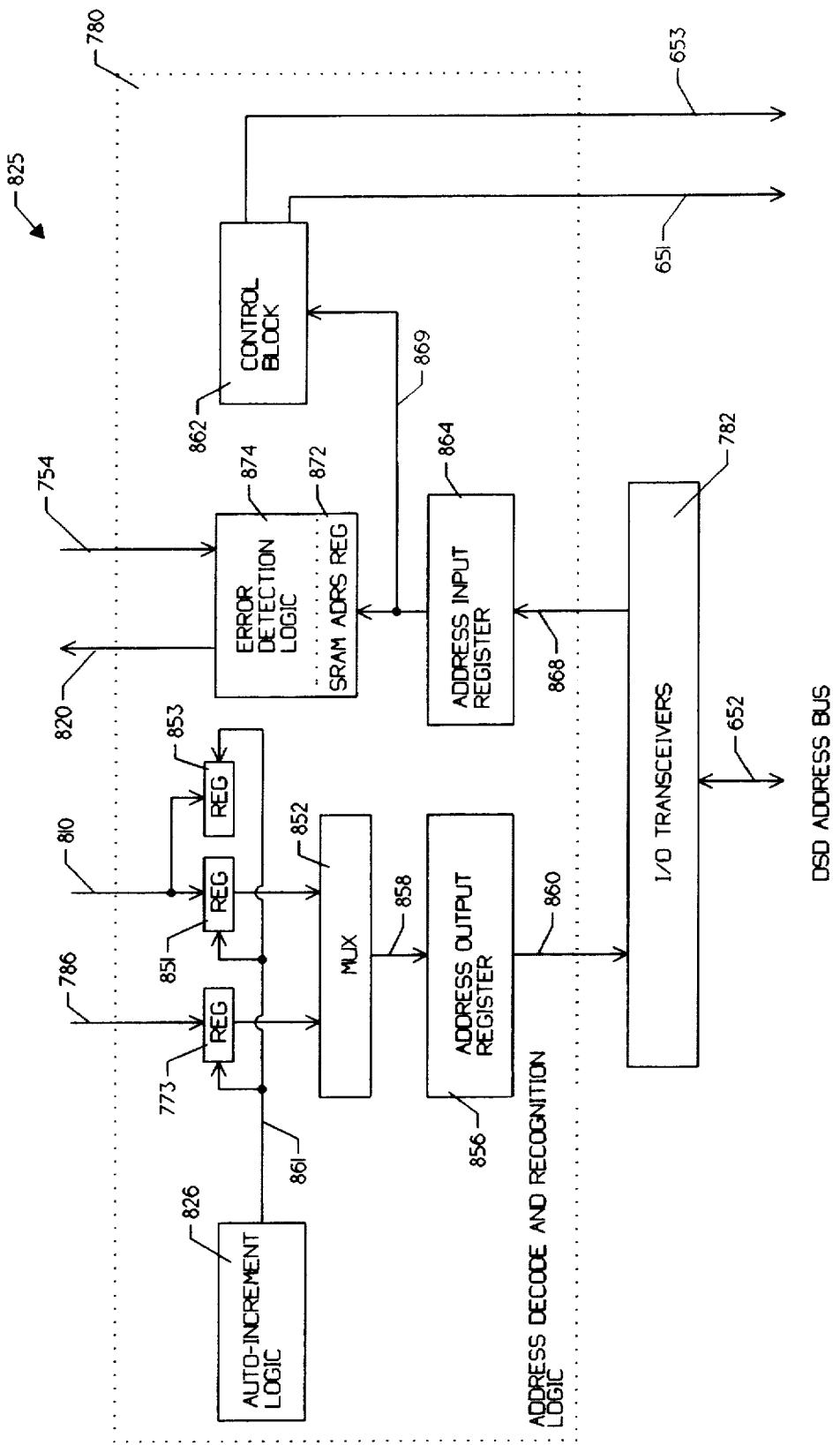
FIG. 10B is a block diagram showing applicable portions of the Address and Recognition Logic block of FIG. 10A.

FIG. 10B is a block diagram showing applicable portions of the Address and Recognition Logic block of FIG. 10A. The block diagram is generally shown at 825. In the exemplary embodiment, Address and Recognition Logic block 780 includes an address output register 856 and an address input register 864. Address output register 856 is coupled to an outgoing port of I/O buffer block 782 via interface 860. Similarly, address input register 864 is coupled to an in-going port of I/O buffer block 782 via interface 868.

An address is provided to register 773 by MBUS 638 via interface 786, as described above. Further, an address is provided to register 851 by dynamic scan register 809 via interface 810, as described above. When MBUS 638 is providing an address to DSD address bus 652, multiplexer 852 selects the output of register 773. Similarly, when NIM 635 is providing an address via dynamic scan register 809, multiplexer 852 selects the output of register 851. Multiplexer 852 provides the selected address to address output register 856 via interface 858. Address output register 856 provides the address to DSD address bus 652 via I/O buffer block 782.

Address recognition block 780 determines if a request on interface 786 comprises an address. If the request comprises an address, corresponding control signals provided by register 772 via interface 786 determine the appropriate format thereof. For example, one format for an address may indicate that the present address should be loaded, but each address thereafter should be generated by an automatic increment block 826 (see FIG. 12). Address recognition logic block 780 makes this determination and alerts auto-increment block 826. Auto-increment block 826 may thereafter automatically increments and/or decrements the value in registers 773, 851, or 853 via interface 861.

Address input register 864 is coupled to DSD address bus 652 via I/O buffer block 782. Address input register 864 latches the contents of DSD address bus 652 and monitors the contents thereof. Address input register 864 is coupled to a control block 862 via interface 869. Control block 862 monitors the DSD address via the address input register 864 and provide appropriate control signals to DSD bus 650 via interfaces 651 and 653. In the exemplary embodiment, control block 862 provides control signals that memory 680 and disk controller 682 do not otherwise provide. For example, control block 862 provides four (4) byte enable signals, and a read/write enable signal (see FIG. 11A—11B) to memory 680 via interface 653. Also, the NCR53C720 SCSI controller 682 requires a ready-in signal to be asserted by a slave device indicating that the slave device is ready to transfer data. DSDC ASIC 636 provides the ready-in signal to NCR53C720 SCSI controller 682 via interface 651 for both DSDC 636 and memory 680.

Finally, an error detection logic block 874 is coupled to address input register 864 via interface 869. Error detection logic block 874 includes an SRAM address register 872. SRAM address register 872 captures an SRAM address when an SRAM read error is detected. That is, SRAM address register 872 stores the read address that is present on DSD address bus 650 in response to an SRAM read error. Error detection block 874 monitors the data that is present in DSD bus 650 via interface 754. Error detection block 874 thus performs a parity check or the like on the data presently read from memory 680. If an error exists, error detection block 874 enables SRAM address register thereby capturing the current read address. This may identify the faulty read address within memory 680. Error detection block 874 then provides the faulty read address to USBCO 640 for further processing via interface 820. For example, USBCO 640 may read and write various test patterns to the faulty read address to determine if the fault was caused by a soft error or a hard error. If the fault was caused by a soft error, the contents of memory 680 is reloaded and the operation of the computer system continues. However, if the fault was caused by a hard error, the operation of the computer system is interrupted. Other error detection schemes are contemplated and may be incorporated into error detection block 874.

FIGs. 11A-11B comprise a table illustrating an exemplary bus description of the DSD bus of FIG. 9. The table is generally shown at 900. DSD bus 650 includes a number of fields. The type of fields can be generally broken down into data fields, address fields, parity fields, and control fields. The fields for an exemplary embodiment of DSD bus 650 are described below.

DSD bus 650 includes a 32 bit data bus as shown at 902. The 32 bit data bus is a bi-directional data bus and serves as the main data path for all operations. The 32 bit data bus is asserted by a bus master for write operations and a bus slave for read operations.

DSD bus 650 further comprises a 4 bit data parity bus as shown at 904. Each of the four parity bits correspond to predetermined data bits of 32 bit data bus 902. The 4 bit data parity bus is used for error detection and correction purposes.

DSD bus 650 further comprises a 30 bit address bus as shown at 906. The 30 bit address bus is a bi-directional address bus and serves as the main address path for all operations. The 30 bit address bus is asserted by a bus master.

DSD bus 650 further comprises an address status line (ADS) as shown at 908. The address status line may be active low and when asserted by a bus master, indicates that the value on the 30 bit address bus 906 is valid. In an exemplary mode, the address status line is asserted to indicate a start of a bus cycle.

DSD bus 650 further comprises a write/read line (W-R) as shown at 910. The write/read line may be active low and indicates the direction of the data transfer relative to the bus master. The write/read line is driven by the bus master.

DSD bus 650 further comprises a hold line as shown at 912. The hold line is asserted by the disk controller 682 to request bus mastership. The hold line may be active low and is provided by the NCR53C720 SCSI I/O processor 682.

DSD bus 650 further comprises a hold acknowledge (HLDAI) line as shown at 914. The hold acknowledge line is asserted by DSD bus arbitration logic 786 to indicate that the previous bus master has relinquished control of the DSD bus 650. The hold acknowledge line may be active low.

DSD bus 650 further comprises a bus clock (BCLK) line as shown at 916. The bus clock signal controls the DMA portion of the NCR53C720 SCSI I/O processor 682. The bus clock is provided by DSDC 636.

DSD bus 650 further comprises a chip reset line as shown at 918. The chip reset line may be active low and forces a synchronous reset of the NCR53C720 SCSI I/O processor 682. In the exemplary embodiment, the chip reset line may be asserted by DSDC 636 for a minimum of 15 bus cycles.

DSD bus 650 further comprises a chip select (CS) line as shown at 920. The chip select line selects the NCR53C720 SCSI I/O processor 682 as a slave device. In the exemplary embodiment, the chip select line may be active low and may be connected to address bit 6 of the 30 bit address bus discussed above.

DSD bus 650 further comprises an interrupt (IRQ) line as shown at 922. The interrupt line may be active low and indicates that service is required from USBCO 640 and/or USBC1 642.

Referring to FIG. 11B, DSD bus 650 further comprises four byte enable (BE) lines as shown at 924, 926, 928, and 930. Each of the bus enable lines are active low and each may be asserted by the bus master. A first byte enable line (BE0) enables the transfer of data over data bus lines 24-31. A second byte enable line (BE1) enables the transfer of data over data bus lines 16-23. A third byte enable line (BE2) enables the transfer of data over data bus lines 8-15. Finally, a fourth byte enable line (BE3) enables the transfer of data over data bus lines 0-7.

DSD bus 650 further comprises a ready-in (READYI) line as shown at 932. The ready-in line is provided by the slave device to the master device indicating that the slave device is ready to transfer data to the master device. The ready-in line is active low and may be provided by DSDC 636 even if DSDC 636 is not the master of the bus.

DSD bus 650 further comprises a ready-out (READYO) line as shown at 934. The ready-out line is asserted to indicate the end of a slave cycle. In the exemplary embodiment, the ready-out line is active low and may be provided by disk controller 682 to terminate a slave cycle.

DSD bus 650 further comprises a master line as shown at 936. The master line is asserted by the NCR53C720 I/O processor 682 to indicate it has become bus master. The master line may be active low.

DSD bus 650 further comprises a bus mode select (BS) bus as shown at 938. The bus mode select bus selects the bus mode and addressing mode of the NCR53C720 I/O processor 682. In the exemplary embodiment, the bus mode select bus is set to "010" thereby selecting a 80386DX like bus mode (bus mode 4) and the big endian addressing mode.

Finally, DSD bus 650 further comprises a scripts autostart mode (AUTO) line at shown at 940. The scripts autostart mode line selects either auto or manual scritps start mode. Script routines may be stored in memos 680 and may control a RISC processor in NCR53C720 SCSI I/O processor 682. When scripts autostart mode is set low, the execution of the scripts programs starts at address zero of a DSP register within NCR53C720 SCSI I/O processor 682, immediately following a chip reset. When scripts autostart mode is set high, the execution of the scripts programs starts at an address which corresponds to a value which is loaded into the DSP register by USBC0 640 and/or USBC1 642, immediately following a chip reset. In the exemplary embodiment, the scripts auto start mode line is set to one.

As indicated with reference to FIG. 9, a number of control signals are provided between DSDC 636 and disk controller 682 via interface 651. These signals include the signals shown at 906, 908, 910, 912, 914, 916, 918, 920, 922, 932, 934, 936, and 938. Similarly, a number of control signals are provided between DSDC 636 and memory 680 via interface 653. These signals include a memory read/write enable signal and the four byte enable signals shown at 924, 926, 928 and 930.

Figure 12:
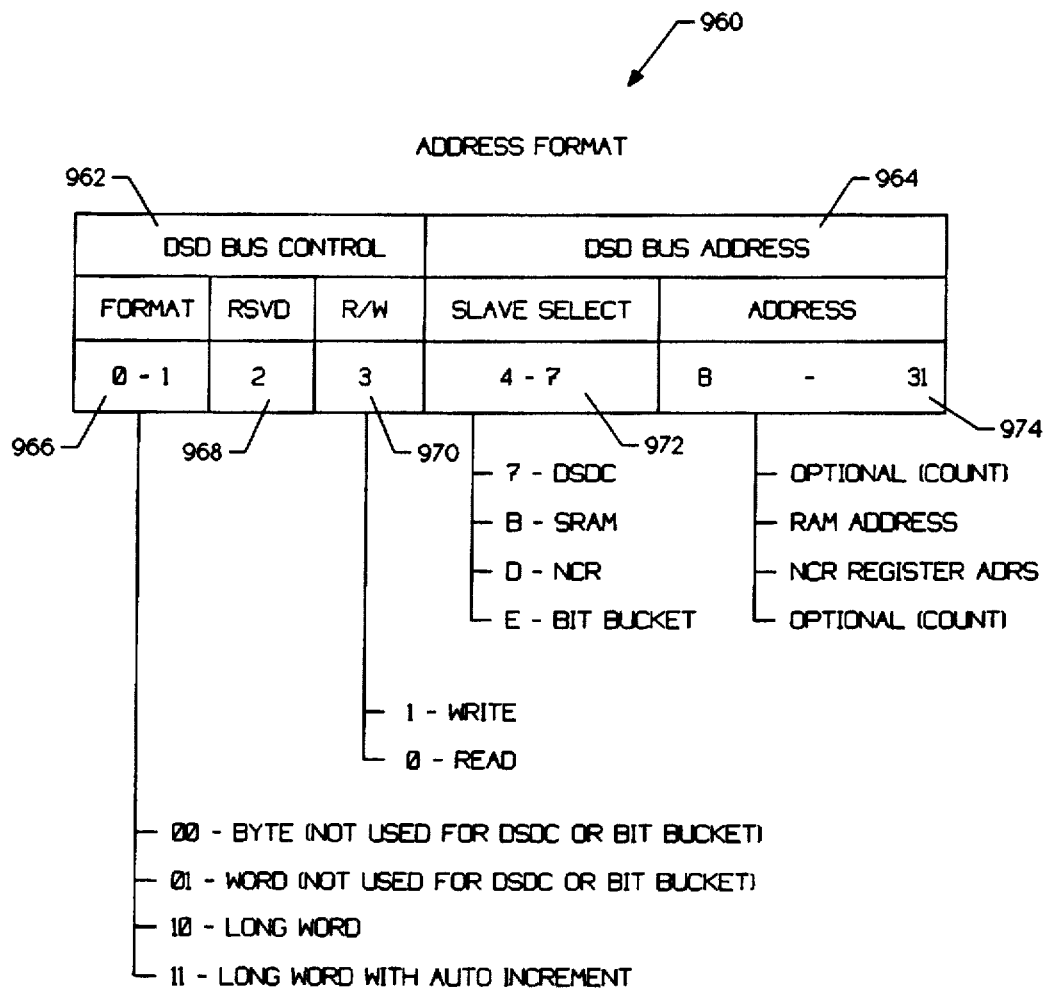
FIG. 12 is a table illustrating an exemplary address format for the address field of the DSD bus of FIG. 9.

FIG. 12 is a table illustrating an exemplary address format for the address field of the DSD bus of FIG. 9. The table is generally shown at 960. The address format of the address field of DSD bus 650 includes DSD bus control signals 962 and DSD bus address signals 964. The DSD bus control signals include a format field 966, a reserved field 968, and a read/write field 970. The DSD address signals include a slave select field 972 and an address field 974.

The format field 966 specifies the format of a corresponding address. For example, the format field specifies the format of a corresponding address as a long word or a long word with auto increment. The auto increment option is further discussed above with reference to FIG. 10A and FIG. 10B. The read/write field 970 indicates whether the corresponding address is requesting a read or write operation.

The slave select field 972 indicates which of the three devices attaches to DSD bus 650 is to be the slave. That is, if DSDC 636 has bus mastership and is providing the address, the slave select field indicates whether NCR53C720 682 or memory 680 is to be the slave. Finally, the address field 974 provides a valid address to the selected slave device. That is, if memory 680 is the slave device, the address field 974 provides a valid memory address thereto. Under some conditions, the address field is optional as shown. That is, when DSDC 636 is the slave device, the address field is optional. The slave select field identifier shown below slave select field 972 correspond to the address field identifiers shown below address field 974. Format bits 0 and 1, and address bits 30 and 31 are decoded to provide the bi-directional byte enable signals 924, 926, 928, and 930 as shown in FIG. 11B.

Figure 13:
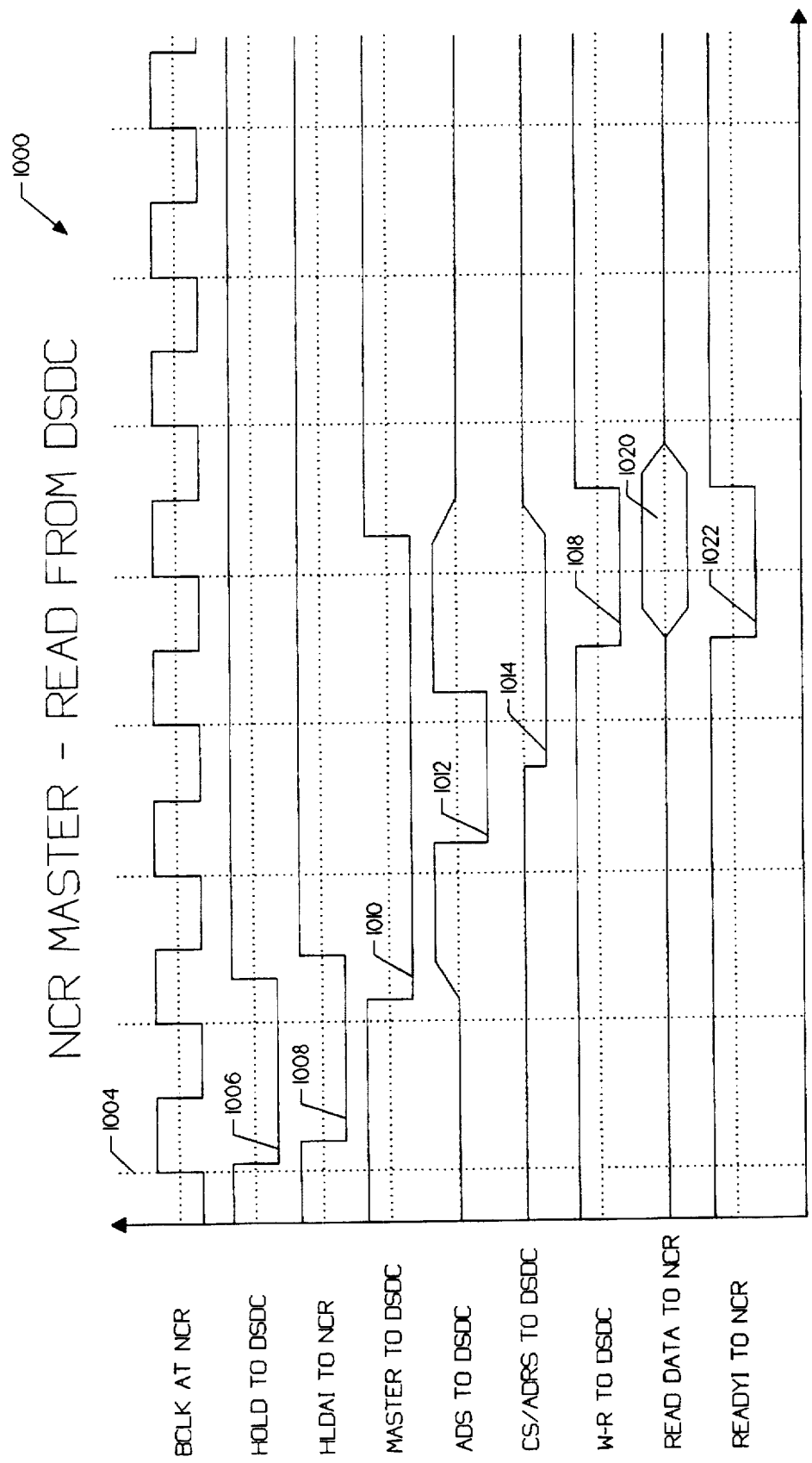
FIG. 13 is a timing diagram illustrating an exemplary read cycle on the DSD bus wherein the NCR chip is the master and the DSDC device is the slave.

FIG. 13 is a timing diagram illustrating an exemplary read cycle on the DSD bus wherein the NCR chip is the master and the DSDC device is the slave. The timing diagram is generally shown at 1000. In the exemplary embodiment, NCR53C720 682, memory 680, and DSDC 636 are coupled to the DSD bus 650. Tri-state transceivers are used by all three devices to interface with the bi-directional lines of the DSD bus 650. Data transfer cycles are initiated and terminated by whichever device is bus master at given time. The direction of data transfer (read/write) is relative to the bus master. Only one device can be bus master for a given data transfer cycle.

When one of the three devices is the bus master, one of the two remaining devices is the bus slave, and is either the source (read) or destination (write) of the data transfer. The third device on DSD bus 650 is inactive. NCR53C720 682 and DSDC 636 can be either a bus master or a bus slave, while memory 680 can only be a bus slave. Arbitration logic 786 in DSDC 636 determines which device will be the next bus master when the present bus master relinquishes control of DSD bus 650.

Referring specifically to NCR53C720 682, NCR53C720 682 arbitrate for bus mastership to fetch SCRIPTS instructions from memory 680 and to transfer data to/from the SCSI interface 554. After an instruction fetch or data transfer is complete, NCR53C720 682 may relinquish bus mastership. When executing block move instructions, NCR53C720 682 relinquishes bus mastership after transferring eight long words. However, if more data needs to be transferred, NCR53C720 682 waits 5 to 8 clock cycles and then initiates arbitration to regain bus mastership to transfer up to 8 more long words. This process continues until the block move instruction is complete. In the exemplary embodiment, the effective data transfer rate of a block move instruction to/from the SCSI disk(s) is in excess of 20MB/s.

Referring specifically to FIG. 13, wherein an exemplary read operation is shown with NCR53C720 682 as bus master and DSDC 636 is bus slave. The signal names provided along the left side of timing diagram 1000 generally correspond to the signals described with reference to FIGS. 11A and 11B.

At time 1004, NCR53C720 682 asserts a hold signal as shown at 1006, indicating to all of the devices coupled to DSD bus 650 that NCR53C720 682 is requesting bus mastership. Arbitration logic 786 within DSDC 636 receives the hold signal 1006 and asserts a hold acknowledge signal in response thereto, as shown at 1008, indicating that the previous bus master has relinquished control of DSD bus 650. On the next bus clock cycle, NCR53C720 682 asserts a master signal to DSDC 636 as shown at 1010, indicating to DSDC 636 that NCR53C720 682 has become bus master of DSD bus 650. NCR53C720 682 then asserts an address status signal as shown at 1012. The address status signal indicates the start of a bus cycle. Shortly thereafter, and while the address status signal is still asserted, NCR53C720 682 provides an address to DSDC 636 as shown at 1014. The select slave field of the address selects DSDC 636 to be the slave for this bus transaction.

NCR53C720 682 then provides a read/write signal 1018 to DSDC 636. The read/write signal 1018 indicates that NCR53C720 682 is requesting to read data from DSDC 636.

Finally. DSDC 636 provides a ready-in 1022 signal to NCR53C720 682, indicating that DSDC 636 is ready to transfer data thereto. The read data on DSD bus 650 is then provided as shown at 1020.

Figure 14:
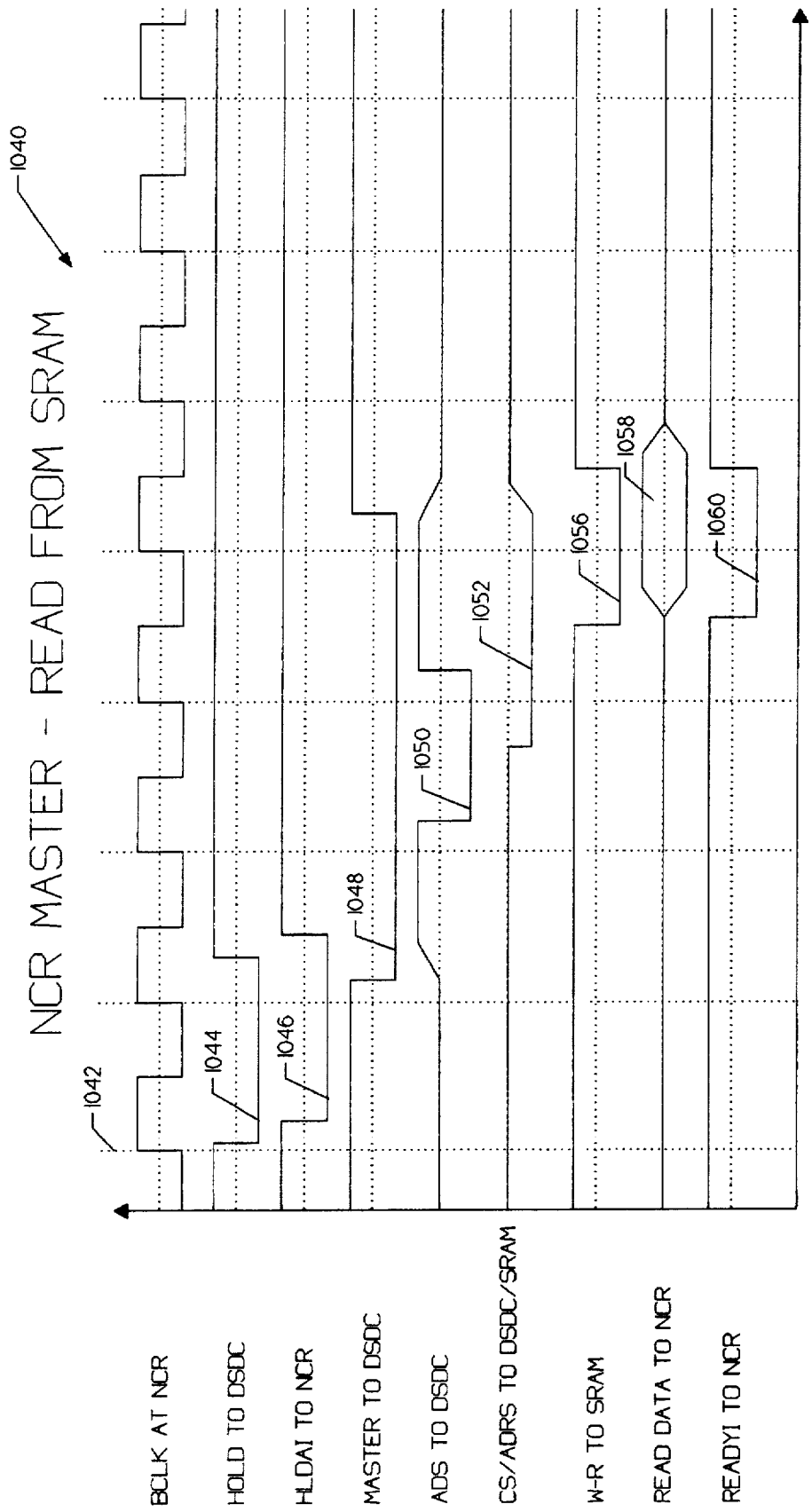
FIG. 14 is a timing diagram illustrating an exemplary read cycle on the DSD bus wherein the NCR chip is the master and the SRAM device is the slave.

FIG. 14 is a timing diagram illustrating an exemplary read cycle on the DSD bus wherein the NCR chip is the master and the SRAM device is the slave. The timing diagram is generally shown at 1040. The signal names provided along the left side of timing diagram 1040 generally correspond to the signals described with reference to FIGS 11A and 11B.

At time 1042, NCR53C720 682 asserts a hold signal as shown at 1044, indicating to all of the devices coupled to DSD bus 650 that NCR53C720 682 is requesting bus mastership. Arbitration logic 786 within DSDC 636 receives the hold signal 1044 and asserts a hold acknowledge signal in response thereto, as shown at 1046, indicating that the previous bus master has relinquished control of DSD bus 650. On the next bus clock cycle, NCR53C720 682 asserts a master signal to DSDC 636 as shown at 1048, indicating to DSDC 636 that NCR53C720 682 has become bus master of DSD bus 650. Note that it is not necessary to provide the master signal to memory 680 because memory 680 cannot be a bus master. NCR53C720 682 then asserts an address status signal as shown at 1050. The address status signal indicates the start of a bus cycle. Shortly thereafter, and while the address status signal is still asserted, NCR53C720 682 provides an address to DSDC 636 and memory 680 as shown at 1052. The select slave field of the address selects memory 680 to be the slave for this bus transaction.

NCR53C720 682 then provides a read/write signal 1056 to memory 680. The read/write signal 1056 indicates that NCR53C720 682 is requesting to read data from memory 680. Finally, memory 680 provides a ready-in signal 1060 to NCR53C720 682, indicating that memory 680 is ready to transfer data thereto. The read data on DSD bus 650 is shown at 1058.

Figure 15:
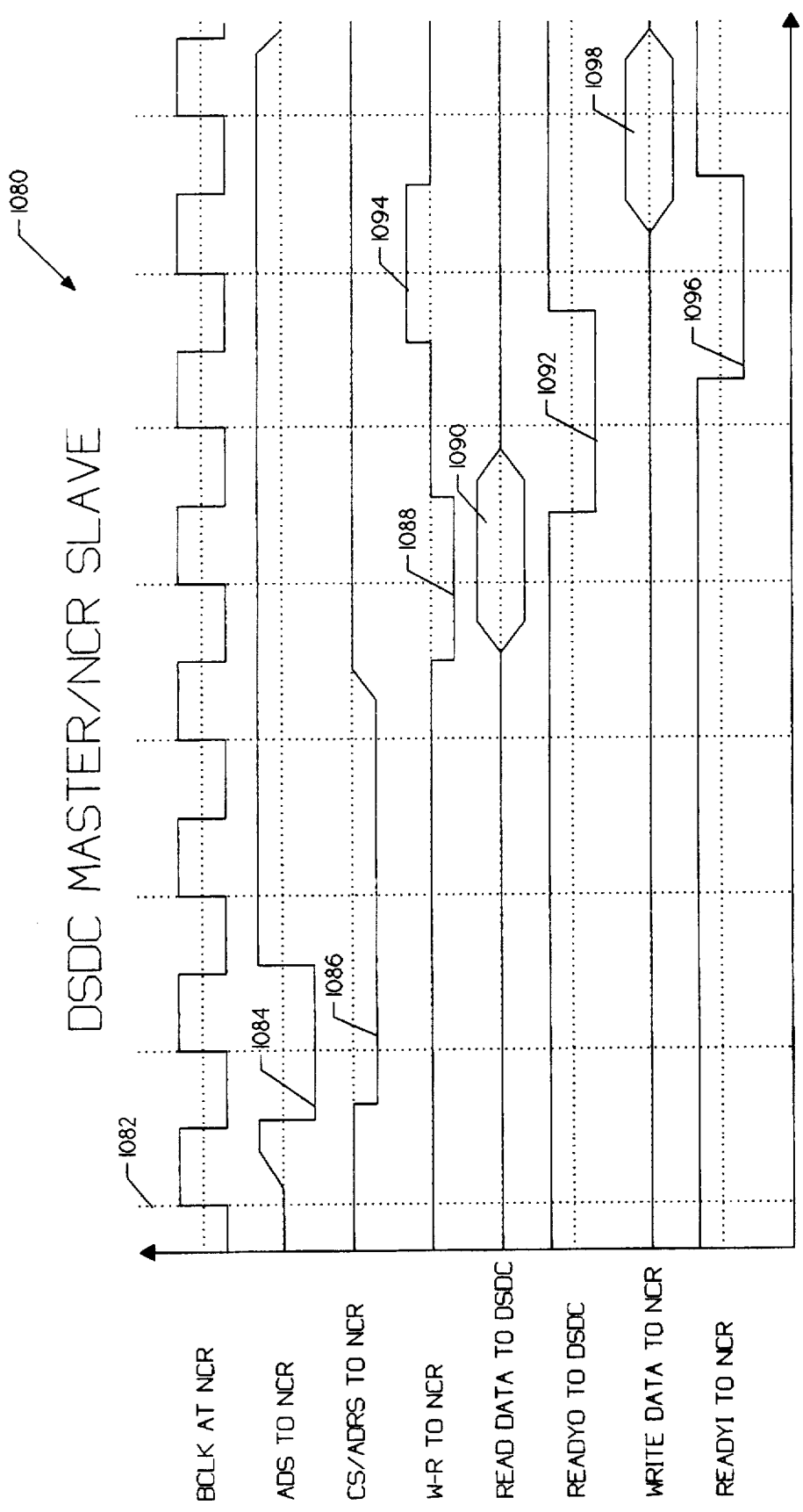
FIG. 15 is a timing diagram illustrating an exemplary read and write cycle on the DSD bus wherein the DSDC device is the master and the NCR chip is the slave.

FIG. 15 is a timing diagram illustrating an exemplary read and write cycle on the DSD bus wherein the DSDC device is the master and the NCR53C720 is the slave. The timing diagram is generally shown at 1080. At time 1082, DSDC 636 asserts an address status signal as shown at 1084. The address status signal indicates to NCR53C720 682 the start of a bus cycle. Shortly thereafter, and while the address status signal is still asserted, DSDC 636 provides a chip select signal and an address to NCR53C720 682 and memory 680 as shown at 1086. The chip select signal selects the NCR53C720 682 as the slave device. The chip select signal includes the slave select field 972 of the DSD address 964.

DSDC 636 then provides a read/write signal 1088 to NCR53C720 682. At 1088, DSDC 636 provides a low on the read/write signal indicating that DSDC 636 is requesting a read from NCR53C720 682. NCR53C720 682 then provides the requested read data to DSDC 636 as shown at 1090. Thereafter, NCR53C720 682 provides a ready-out signal 1092 to DSDC 636 to indicate the end of the slave bus cycle. DSDC 636 then provides a read/write signal 1094 to NCR53C720 682. At 1094, DSDC 636 provides a high on the read/write signal indicating that DSDC 636 is requesting to write to NCR53C720 682. DSDC 636 provides a ready-in signal 1096 to NCR53C720 682, indicating that DSDC 636 is ready to write data thereto. DSDC 636 then provides the write data to NCR53C720 682 as shown at 1098.

Figure 16:
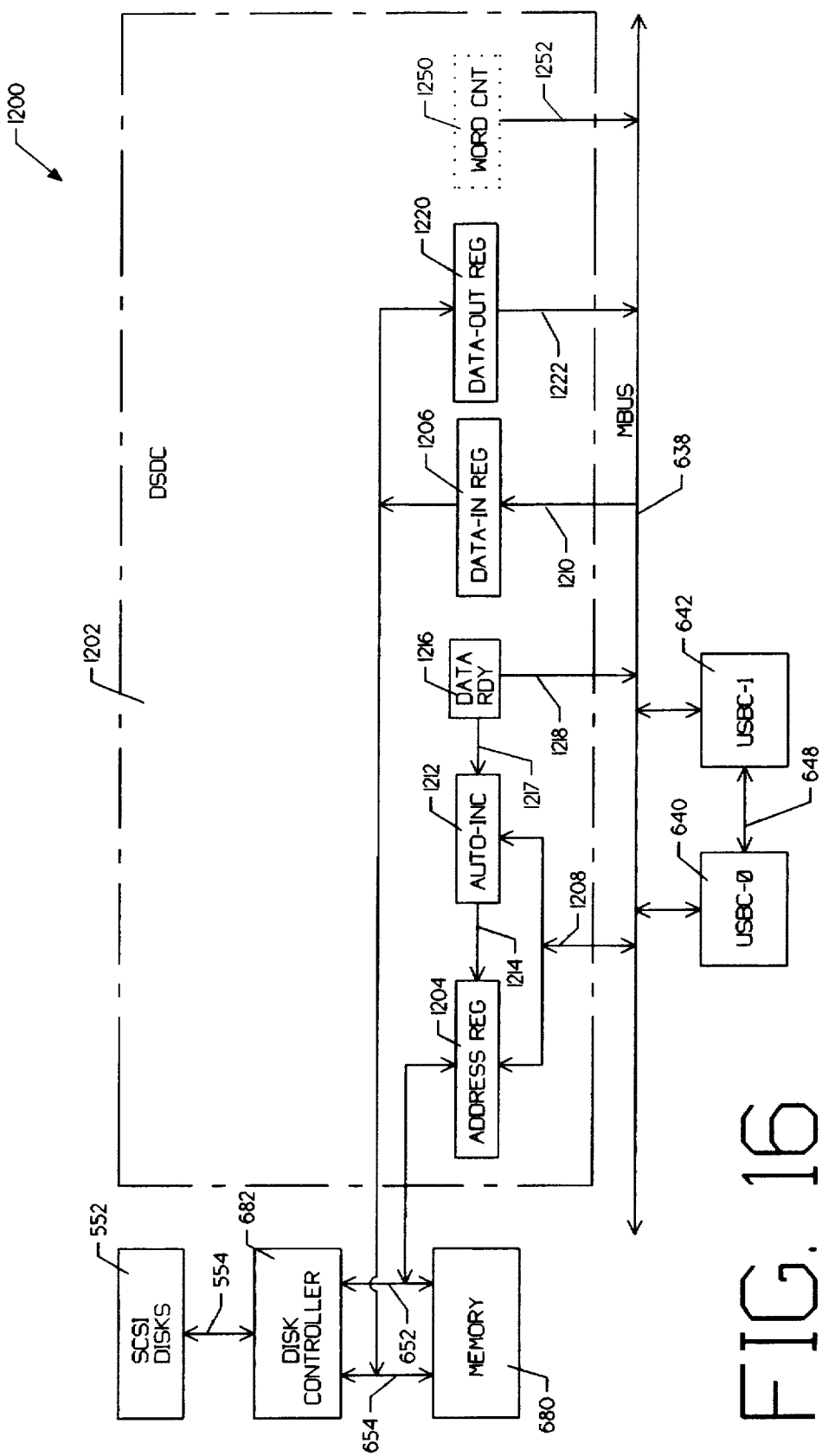
FIG. 16 is a block diagram showing another exemplary embodiment of the present invention which may be used in conjunction with the system described with reference to FIGS. 7–15.

FIG. 16 is a block diagram showing another exemplary embodiment of the present invention which may be used in conjunction with the system described with reference to FIGS. 7–15. The block diagram is generally shown at 1200. In the exemplary embodiment, a memory interface block 1202 includes a data save disk controller (DSDC) 636. DSDC 636 provides an interface between a first bus 638 and a second bus 650. The first bus is a modified common bus and may be coupled to a number of microsequencer bus controllers (USBCs) 640 and 642. The second bus is a common bus and may be coupled to a memory unit 680 and a disk controller 682. DSDC 636 element includes an address register 1204, a data register 1206, and an auto-increment block 1212.

When a USBC 640 initiates a read of memory unit 680, USBC 640 provides an address to address register 1204 via bus 638 and interface 1208. The address contains both a memory address and a number of control bits. A portion of the control bits are coupled to auto-increment block 1212 and control auto-increment block 1212. If USBC 640 provides the appropriate combination of control bits within the address, auto-increment block 1212 is enabled, thereby automatically incrementing the value in address register 1204 after each memory access. Address register 1204 provides the memory address to memory unit 680 via interface 652 of the second bus 650 wherein memory unit 680 may read the corresponding address location and may provide a resulting data word to data-out register 1220. USBC 640 then reads the contents of data-out register 1220 over the first bus 638 via interface 1222 to complete the read operation. Thereafter, if auto-increment block 1212 is enabled, the address is automatically incremented after each memory access is complete. In an exemplary embodiment, DSDC 636 has a data ready block 1216 wherein data ready block 1216 provides a data ready bit to auto-increment block 1212 via interface 1217 to indicate that a corresponding memory access is complete and that the address may be incremented. Thus, USBC 640 only needs to read the contents of data-out register 1220 to complete each successive read operation. In the exemplary embodiment, data ready block 1216 detects when USBCO 640 reads data-out register 1220 during each successive read operation, thereby indicating when a previous read operation is complete.

When USBC 640 initiates a write of memory unit 680, USBC 640 provides an address to address register 1204 during a first bus transfer. Similarly, USBC 640 provides a data word to data-in register 1206 during a second bus transfer. The address includes both a memory address a number of control bits. A portion of the control bits are coupled to auto-increment block 1212 and control auto-increment block 1212. If USBC 640 provides the appropriate combination of control bits within the address, auto-increment block 1212 is enabled, thereby automatically incrementing the value in address register 1204 after each memory access. Address register 1204 provides the memory address to memory unit 680 via interface 652 and data register 1206 provides the data word to memory unit 680 via interface 654. Memory unit 680 then writes the data word to the corresponding address location within memory unit 680. Thereafter, if auto-increment block 1212 is enabled, the value in address register 1204 is automatically incremented. In an exemplary embodiment, the DSDC 636 has a data ready block 1216 wherein the data ready block 1216 provides a data ready bit to auto-increment block 1212 via interface 1217 to indicate when a corresponding memory access is complete. Thus, USBC 640 only needs to provide a write data word to data register 1206 to complete each successive write operation. In the exemplary embodiment, data ready block 1216 detects when USBCO 640 writes a data word to data-in register 1206 for each successive write operation, thereby indicating when a previous write operation is complete.

It is contemplated that a word count register 1250 may also be provided in DSDC 636. USBC 636 provides a word count to word count register 1250 during a first read or write operation via interface 1252. Thereafter, the word count stored in word count register 1250 is decremented after each successive memory access. When the word count reaches a predetermined value, DSDC 636 and/or USBC 640 are notified and the corresponding memory operation is terminated.

Figure 17:
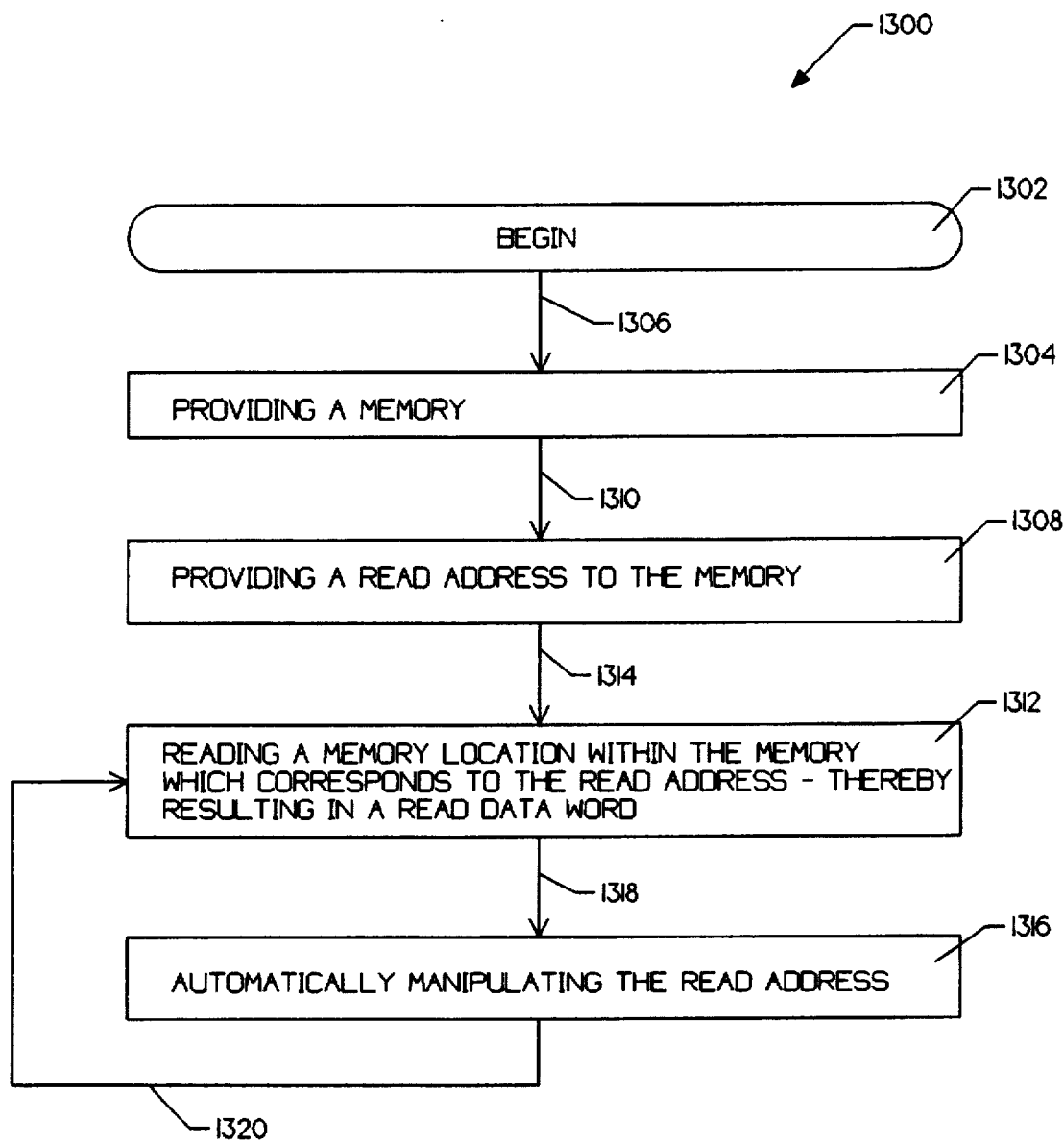
FIG. 17 is a flow diagram showing a first exemplary read operation of the present invention.

FIG. 17 is a flow diagram showing a first exemplary read operation of the present invention. The flow diagram is generally shown at 1300. The flow diagram is entered at element 1302, wherein control is passed to element 1304 via interface 1306. Element 1304 provides a memory. Control is then passed to element 1308 via interface 1310. Element 1308 provides a read address to the memory. Control is then passed to element 1312 via interface 1314. Element 1312 reads a memory location within the memory, wherein the memory location corresponds to the read address. The memory then provides a resulting read data word. Control is then passed to element 1316 via interface 1318. Element 1316 automatically manipulates the read address. Control is then passed back to element 1312 via interface 1320.

Figure 18:
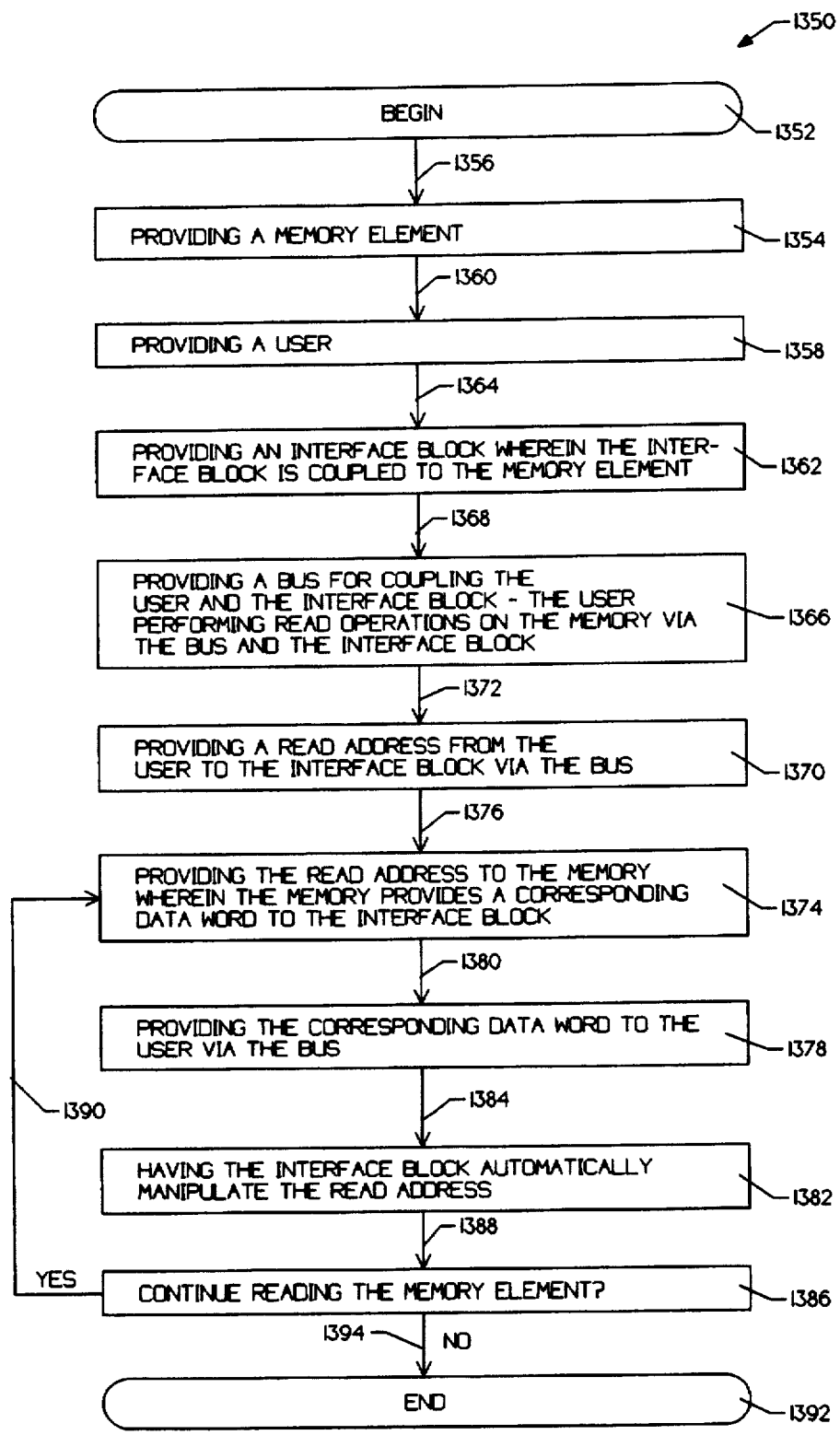
FIG. 18 is a flow diagram showing a second exemplary read operation of the present invention.

FIG. 18 is a flow diagram showing a second exemplary read operation of the present invention. The flow diagram is generally shown at 1315. The algorithm is entered at element 1352, wherein control is passed to element 1354 via interface 1356. Element 1354 provides a memory element. Control is then passed to element 1358 via interface 1360. Element 1358 provides a user. Control is then passed to element 1362 via interface 1364. Element 1362 provides an interface block, wherein the interface block is coupled to the memory element. Control is then passed to element 1366 via interface 1368. Element 1366 provides a bus for coupling the user and the interface block, wherein the user may perform read operations on the memory via the bus and the interface block. Control is then passed to element 1370 via interface 1372. Element 1370 provides a read address from the user to the interface block via the bus. Control is then passed to element 1374 via interface 1376. Element 1374 provides the read address to the memory element, wherein the memory element provides a corresponding data word to the interface block. Control is then passed to element 1378 via interface 1380. Element 1378 provides the corresponding data word to the user via the bus. Control is then passed to element 1382 via interface 1384. Element 1382 automatically manipulates the read address via the interface block. Control is then passed to element 1386 via interface 1388. Element 1386 determines whether another read operation of the memory element is requested. If another read operation of the memory element is requested, control is passed back to element 1374 via interface 1390. If element 1386 determines that another read operation of the memory element is not requested, control is passed to element 1392 via interface 1394, wherein the algorithm is exited.

Figure 19:
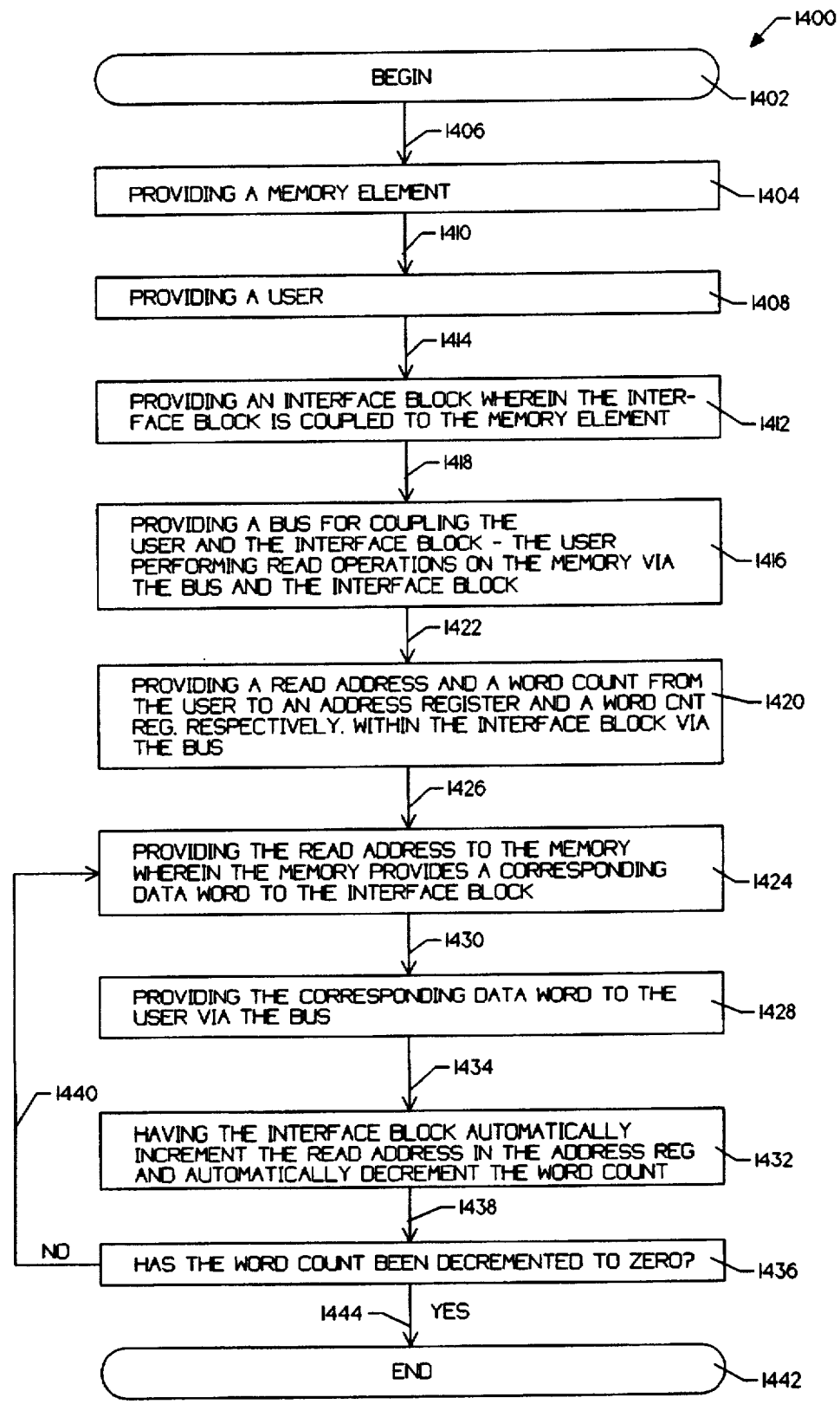
FIG. 19 is a flow diagram showing a third exemplary read operation of the present invention.

FIG. 19 is a flow diagram showing a third exemplary read operation of the present invention. The flow diagram is generally shown at 1400. The algorithm is entered at element 1402, wherein control is passed to element 1404 via interface 1406. Element 1404 provides a memory element. Control is passed to element 1408 via interface 1410. Element 1408 provides a user. Control is then passed to element 1412 via interface 1414. Element 1412 provides an interface block, wherein the interface block is coupled to the memory element. Control is then passed to element 1416 via interface 1418. Element 1416 provides a bus for coupling the user and the interface block, wherein the user may perform read operations on the memory via the bus and the interface block. Control is then passed to element 1420 via interface 1422. Element 1420 provides a read address and a word count from the user to an address register and a word count register, respectively, within the interface block via the bus. Control is then passed to element 1424 via interface 1426. Element 1424 provides the read address to the memory element, wherein the memory element provides a corresponding data word to the interface block. Control is then passed to element 1428 via interface 1430. Element 1428 provides a corresponding data word to the user via the bus. Control is then passed to element 1432 via interface 1434. Element 1432 automatically increments the read address in the address register, and automatically decrements the word count in the word count register. Control is then passed to element 1436 via interface 1438. Element 1436 determines whether the word count in the word count register has been decremented to a predetermined value. If the word count in the word count register has not been decremented to the predetermined value, control is passed back to element 1424 via interface 1440. If the word count in the word count register has been decremented to the predetermined value, control is passed to element 1442 via interface 1444, wherein the algorithm is exited.

Figure 20:
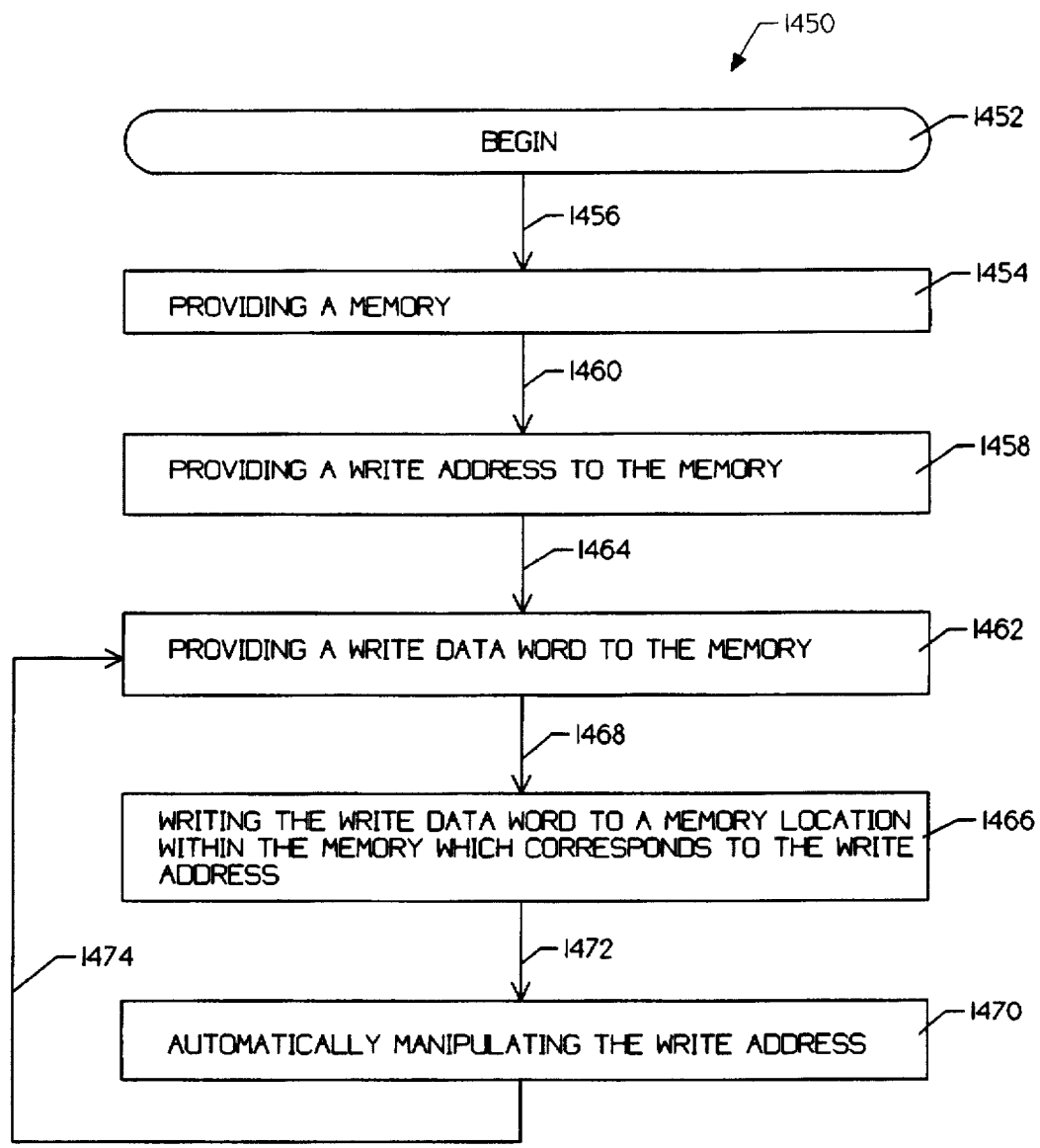
FIG. 20 is a flow diagram showing a first exemplary write operation of the present invention.

FIG. 20 is a flow diagram showing a first exemplary write operation of the present invention. The flow diagram is generally shown at 1450. The algorithm is entered at element 1452, wherein control is passed to element 1454 via interface 1456. Element 1454 provides a memory. Control is then passed to element 1458 via interface 1460. Element 1458 provides a write address to the memory. Control is then passed to element 1462 via interface 1464. Element 1462 provides a write data word to the memory. Control is then passed to element 1466 via interface 1468. Element 1466 writes the write data word to a corresponding memory location within the memory, wherein the corresponding memory location corresponds to the write address. Control is then passed to element 1470 via interface 1472. Element 1470 automatically manipulates the write address. Control is then passed back to element 1462 via interface 1474.

Figure 21:
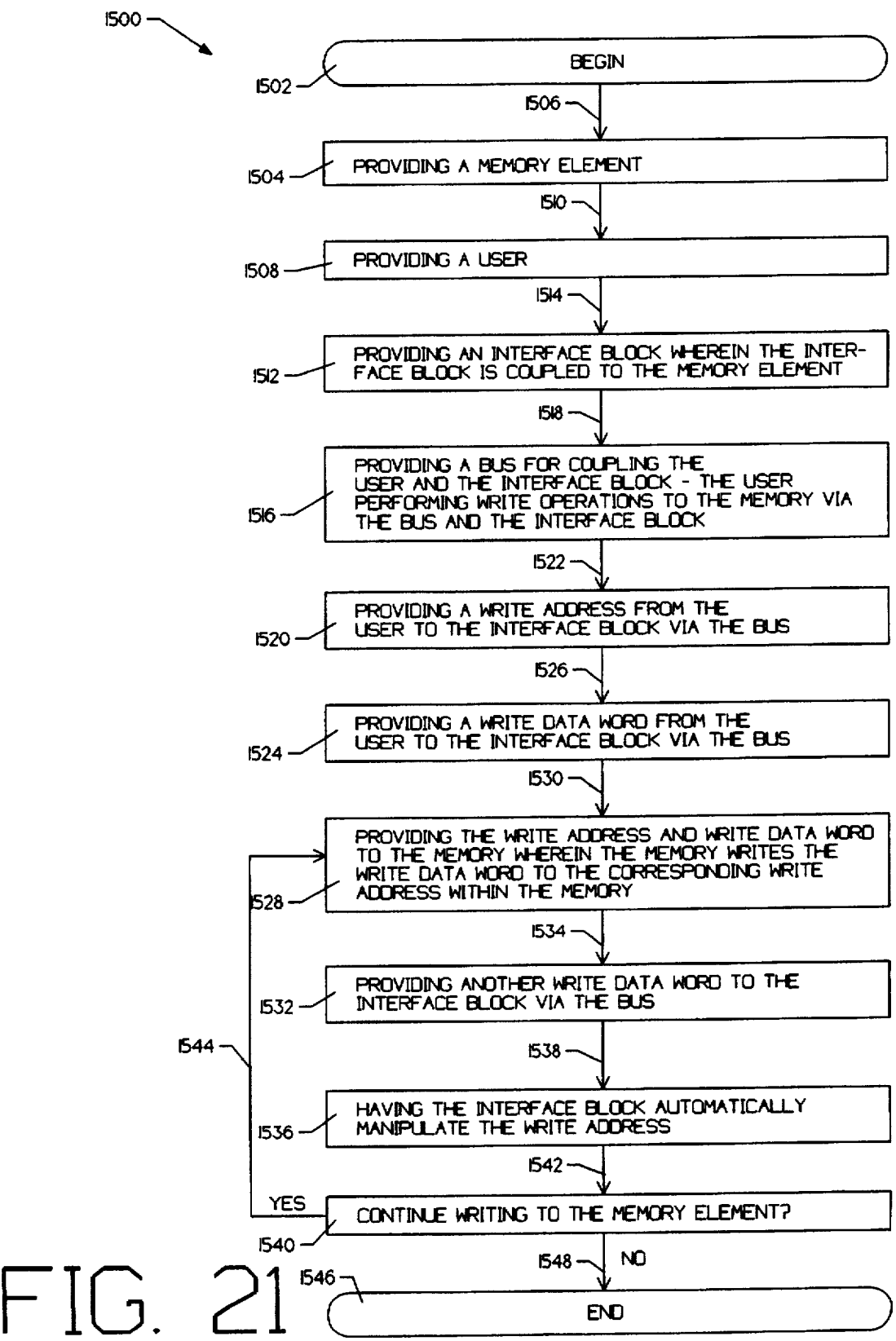
FIG. 21 is a flow diagram showing a second exemplary write operation of the present invention.

FIG. 21 is a flow diagram showing a second exemplary write operation of the present invention. The flow diagram is generally shown at 1500. The algorithm is entered at element 1502, wherein control is passed to element 1504 via interface 1506. Element 1504 provides a memory element. Control is then passed to element 1508 via interface 1510. Element 1508 provides a user. Control is then passed toe element 1512 via interface 1514. Element 1512 provides an interface block, wherein the interface block is coupled to the memory element. Control is then passed to element 1516 via interface 1518. Element 1516 provides a bus for coupling the user and the interface block. The user may perform write operations to the memory via the bus and the interface block. Control is then passed to element 1520 via interface 1522. Element 1520 provides a write address from the user to the interface block via the bus. Control is then passed to element 1524 via interface 1526. Element 1524 provides a write data word form the user to the interface block via the bus. Control is then passed to element 1528 via interface 1530. Element 1528 provides the write address and the write data word to the memory, wherein the memory may write the write data word to the corresponding write address. Control is then passed to element 1532 via interface 1534. Element 1532 provides another write data word to the interface block via the bus. Control is then passed to element 1536 via interface 1538. Element 1536 automatically manipulates the write address via the interface block. Control is then passed to element 1540 via interface 1542. Element 1540 determines whether another write operation is requested. If another write operation is requested, control is passed back to element 1528 via interface 1544. If another write operation is not requested, control is passed to element 1546 via interface 1548, wherein the algorithm is exited.

Figure 22A:
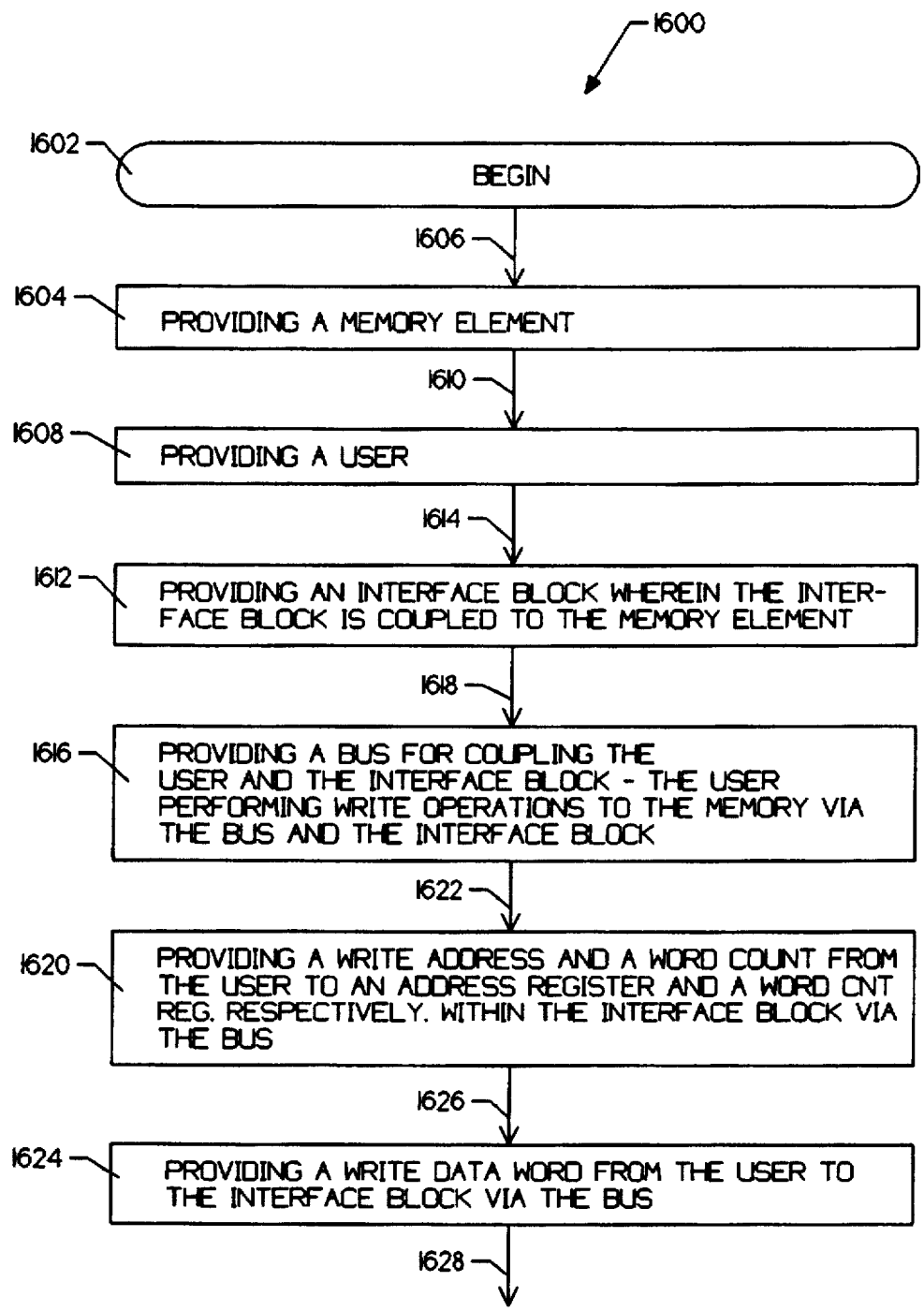
FIG. 22A–22B is a flow diagram showing a third exemplary write operation of the present invention.
Figure 22B:
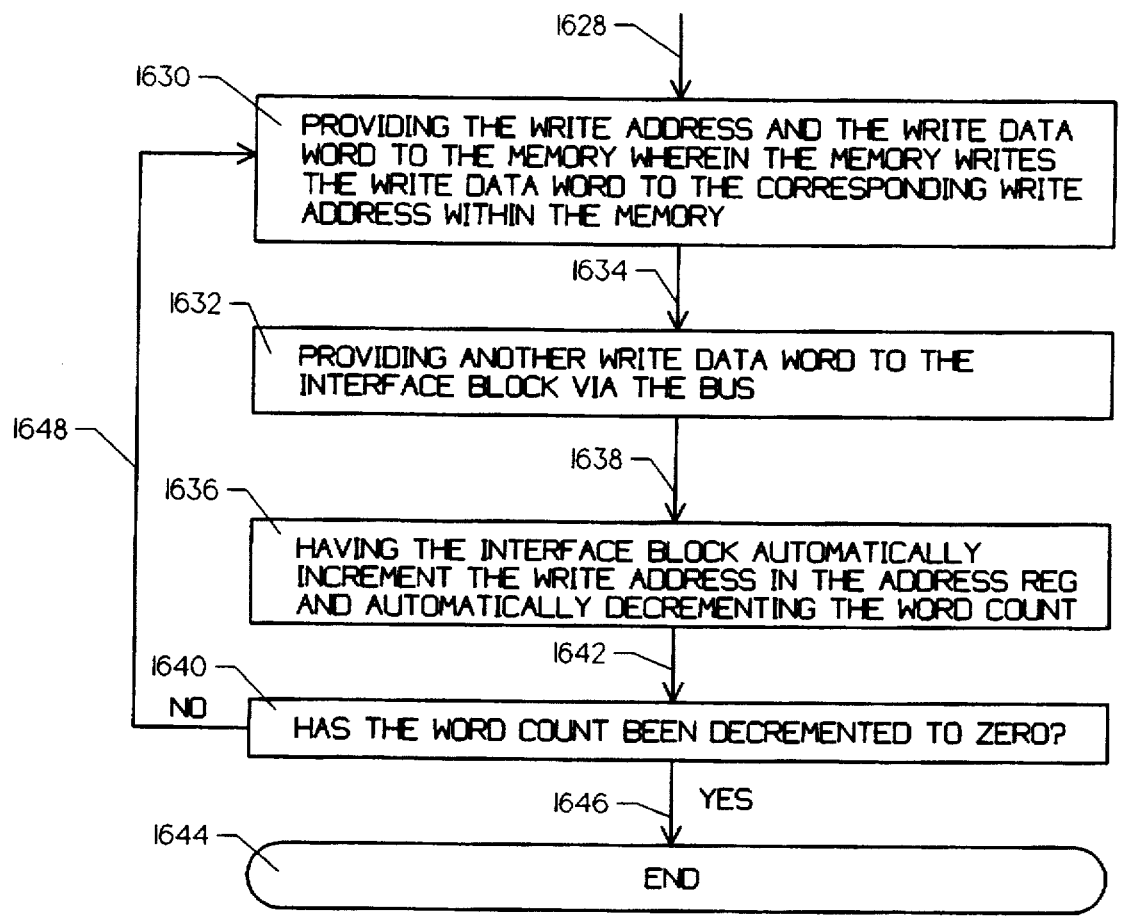

FIGS. 22A-22B is a flow diagram showing a third exemplary write operation of the present invention. The flow diagram is generally shown at 1600. The algorithm is entered at element 1602, wherein control is passed to element 1604 via interface 1606. Element 1604 provides a memory element. Control is then passed to element 1608 via interface 1610. Element 1608 provides a user. Control is then passed to element 1612 via interface 1614. Element 1612 provides an interface block, wherein the interface block is coupled to the memory element. Control is then passed to element 1616 via interface 1618. Element 1616 provides a bus for coupling the user and the interface block. The user may perform write operations to the memory via the bus and the interface block. Control is then passed to element 1620 via interface 1622. Element 1620 provides a write address and a word count from the user to an address register and a word count register, respectively, within the interface block via the bus. Control is then passed to element 1624 via interface 1626. Element 1624 provides a write data word from the user to the interface block via the bus. Control is then passed to element 1630 via interface 1628. Element 1630 provides the write address and the write data word to the memory element, wherein the memory element may write the data word to the corresponding write address. Control is then passed to element 1632 via interface 1634. Element 1632 provides another write data word to the interface block via the bus. Control is then passed to element 1636 via interface 1638. Element 1636 automatically increments the write address in the address register, and automatically decrements the word count in the word count register. Control is then passed to element 1640 via interface 1642. Element 1640 determines whether the word count in the word count register has been decremented to a predetermined value. If the word count in the word count register has not been decremented to the predetermined value, control is passed back to element 1630 via interface 1648. If the word count in the word count register has been decremented to the predetermined value, control is passed to element 1644 via interface 1648, wherein the algorithm is exited.

Having thus described the preferred embodiments of the present invention, those of skill in the art will readily appreciate that the teachings found herein may be applied to yet other embodiments within the scope of the claims hereto attached.

We claim:

1. In a data processing system having a user, a memory unit, and a memory interface unit, wherein the user is coupled to the memory interface unit and the memory interface unit is coupled to the memory unit, the user providing a read address to the memory interface unit via the bus, wherein the read address corresponds to a read address location within the memory unit, the memory interface providing the read address to the memory unit, wherein the memory unit performs a read operation by reading the corresponding read address location and providing a corresponding read data word, the improvement comprising:

a multiplier means coupled to the memory interface unit for multiplying said read address by a number thereby resulting in a manipulated read address, wherein the manipulated read address is directly provided to the memory unit, and the memory unit performs a read operation by reading the read address location that corresponds to the manipulated read address, the memory interface unit providing a corresponding read data word to the user.

2. In a data processing system having a user, a memory unit, and a memory interface unit, wherein the user is coupled to the memory interface unit and the memory interface unit is coupled to the memory unit, the user providing a write address and a write data word to the memory interface unit via the bus, wherein the write address corresponds to a write address location within the memory unit, the memory interface providing the write address and the write data word to the memory unit, wherein the memory unit performs a write operation by writing the write data word to the corresponding write address location, the improvement comprising:

a multiplier means coupled to the memory interface unit for multiplying said write address by a number thereby resulting in a manipulated write address, wherein the manipulated write address is directly provided to the memory unit, and the memory unit performs a write operation by writing a predetermined write data word to the address location that corresponds to the manipulated write address, wherein the predetermined write data word is provided to the memory unit by the user via the memory interface unit.

3. In a data processing system having a user and a memory unit, the improvement comprising:

a. a memory interface unit, wherein the user is coupled to said memory interface unit and said memory interface unit is coupled to the memory unit, the user providing a read address to said memory interface unit, wherein said read address corresponds to a read address location within the memory unit, said memory interface unit providing said read address to the memory unit, wherein the memory unit performs a read operation by reading the corresponding read address location and providing a corresponding read data word; and b. a multiplier circuit coupled to said memory interface unit for multiplying said read address by a number thereby resulting in a manipulated read address, wherein said manipulated read address is directly provided to the memory unit, and the memory unit performs a read operation by reading the read address location that corresponds to the manipulated read address and provides a corresponding read data word to the user.

4. In a data processing system having a user and a memory unit, the improvement comprising:

a. a memory interface unit, wherein the user is coupled to said memory interface unit and said memory interface unit is coupled to the memory unit, the user providing a write address and a write data word to said memory interface unit, wherein said write address corresponds to a write address location within the memory unit, said memory interface unit providing said write address and said write data word to the memory unit, wherein the memory unit performs a write operation by writing said write data word to the corresponding write address location; and b. a multiplier circuit coupled to said memory interface unit for multiplying said write address by a number thereby resulting in a manipulated write address, wherein said manipulated write address is directly provided to the memory unit, and the memory unit performs a write operation by writing a predetermined write data word to the address location that corresponds to said manipulated write address, wherein said predetermined write data word is provided to the memory unit by the user via said memory interface unit.

* * * * *